US009143426B2

United States Patent
Hirasawa et al.

(10) Patent No.: US 9,143,426 B2
(45) Date of Patent: Sep. 22, 2015

(54) COMMUNICATION APPARATUS FOR TRANSMITTING DATA THROUGH A PLURALITY OF DATA-PATHS

(75) Inventors: Satoru Hirasawa, Kawasaki (JP); Yoshimi Sasaki, Kawasaki (JP); Takenari Takahashi, Kawasaki (JP); Takayuki Ohtsuka, Kawasaki (JP); Toshifumi Inoue, Kawasaki (JP); Kenji Fukuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1037 days.

(21) Appl. No.: 12/757,114

(22) Filed: Apr. 9, 2010

(65) Prior Publication Data
US 2010/0274907 A1 Oct. 28, 2010

(30) Foreign Application Priority Data

Apr. 22, 2009 (JP) ................................. 2009-104067

(51) Int. Cl.
*G06F 15/16* (2006.01)
*H04L 12/701* (2013.01)
*H04L 12/709* (2013.01)
*H04L 12/703* (2013.01)
*H04L 12/775* (2013.01)

(52) U.S. Cl.
CPC .............. *H04L 45/00* (2013.01); *H04L 45/245* (2013.01); *H04L 45/28* (2013.01); *H04L 45/583* (2013.01)

(58) Field of Classification Search
CPC ....... H04L 45/583; H04L 45/28; H04L 45/00; H04L 45/245
See application file for complete search history.

(56) References Cited

U.S. PATENT DOCUMENTS

| 5,602,839 | A | * | 2/1997 | Annapareddy et al. ........ 370/405 |
| 6,879,559 | B1 | * | 4/2005 | Blackmon et al. ............. 370/225 |
| 7,031,263 | B1 | * | 4/2006 | Sun et al. ....................... 370/252 |
| 7,616,563 | B1 | * | 11/2009 | Eiriksson et al. .............. 370/230 |

(Continued)

FOREIGN PATENT DOCUMENTS

| EP | 1 465 440 | 10/2004 |
| JP | 11-41246 | 2/1999 |

(Continued)

OTHER PUBLICATIONS

European Search Report dated Jul. 29, 2010, from the corresponding European Application.
Notification of Reason for Refusal dated Jan. 29, 2013, from corresponding Japanese Application No. 2009-104067.

*Primary Examiner* — Arvin Eskandarnia
*Assistant Examiner* — Anthony Fabbri
(74) *Attorney, Agent, or Firm* — Katten Muchin Rosenman LLP

(57) ABSTRACT

A communication apparatus is configured to include first and second cards, and a card-to-card link connecting the cards. Each card is communicably connected to another communication apparatus through a route connected to the card. One of the cards is determined to be a primary card that controls data transmission between the communication apparatus and another communication apparatus, and the other card is determined to be a secondary card controlled by the primary card. The primary card establishes a primary data-path for transmitting primary data, using one of the first and second routes connected to the primary card. The primary card further establishes a secondary data-path for transmitting secondary data, using the card-to-card link, the secondary card, and the other one of the first and second routes connected to the secondary card.

8 Claims, 20 Drawing Sheets

(56) References Cited

U.S. PATENT DOCUMENTS

| | | | |
|---|---|---|---|
| 7,995,463 B2* | 8/2011 | Honma | 370/217 |
| 2006/0221840 A1* | 10/2006 | Yasuoka et al. | 370/242 |
| 2008/0239945 A1* | 10/2008 | Gregg | 370/217 |
| 2009/0109843 A1* | 4/2009 | Yang | 370/225 |
| 2009/0129262 A1* | 5/2009 | Honma | 370/225 |
| 2010/0274907 A1* | 10/2010 | Hirasawa et al. | 709/227 |
| 2011/0019651 A1* | 1/2011 | Fulknier et al. | 370/338 |

FOREIGN PATENT DOCUMENTS

| | | |
|---|---|---|
| JP | 2000-209278 | 7/2000 |
| JP | 2001-186191 | 7/2001 |
| JP | 2006-279467 | 10/2006 |
| JP | 2009-17190 | 1/2009 |
| WO | 02/096035 | 11/2002 |
| WO | WO 02096035 A1 * | 11/2002 |
| WO | 2008/080427 | 7/2008 |

* cited by examiner

COMMUNICATION APPARATUS FOR TRANSMITTING DATA THROUGH A PLURALITY OF DATA-PATHS

CROSS-REFERENCE TO RELATED APPLICATION

This application is based upon and claims the benefit of priority of the prior Japanese Patent Application No. 2009-104067, filed on Apr. 22, 2009, the entire contents of which are incorporated herein by reference.

FIELD

The present invention relates to a communication apparatus for transmitting data through a plurality of data-paths.

BACKGROUND

As typified by S3G (Super 3G), a communication system in which base stations are connected to each other through multiple data-paths by using a multi-homing method, has been put into practical use. For example, Japanese Laid-Open Patent Application Publication No. 2000-209278 and 2006-279467 disclose about a communication system in which a multi-homing method is employed. According to a multi-homing method, a network within a company can be connected to another network outside the company through a plurality of data-paths, for example, using a plurality of ISPs (Internet Service Providers).

According to a multi-homing method, a communication apparatus, such as a base station, is typically configured to include a card for handling SCTP (Stream Control Transmission Protocol) which is a protocol corresponding to a transmission layer. The card may have, for example, two link ports each connected to a link port of another communication apparatus with which the base station communicates. The card may be configured to include a SCTP handler that terminates a SCTP signal. In the case, one of the two link ports is used for a primary data-path and the other one for a secondary data-path where a global address is assigned to each of the two link ports. Data is transmitted and received through the primary data-path under normal conditions, and the secondary data-path is used as an alternate path when the primary data-path is disconnected, for example, due to a failure. Here, it is also possible to distribute a communication load by using both the primary and secondary data-paths concurrently.

However, in the case where a card has only one link port for communicating with another communication apparatus, the above mentioned multi-homing communication may not be attained. Therefore, to perform a multi-homing communication, each of primary and secondary data-paths needs to be accommodated in a different card. Further, a communication apparatus, such as a base station, may be configured to include a redundant card so as to keep communication even if a failure has occurred in some cards. Adopting a redundant card requires each of primary and secondary data-paths to be accommodated in a different card. However, if each of primary and secondary data-paths is accommodated in a different card, a multi-homing method may not be applied since the primary and secondary data-paths are handled independently by each of SCTP handlers of two different cards.

In order to avoid the above problem, it may be possible to configure an access controller of the card, which is normally configured to provide services such as call processing, to perform a multi-homing communication. However, this causes another problem that the load of the access controller becomes higher, thereby exerting an adverse effect on providing the above-mentioned services such as call processing.

Further, in the case of a card having only one link port for communicating with another communication apparatus, the card may be assigned with one global address and one local address. A multi-homing method according to SCTP uses two global addresses each assigned to one of primary and secondary data-paths. In this case, when a setting for a multi-homing communication has been done within the card, the SCTP handler of the card may try to start a communication with another communication apparatus using both the global address and the local address which are assigned to the card. However, the communication using the local address fails since the local address is effective only within the communication apparatus. As a result, a multi-homing communication with another communication apparatus may not be performed. This case is also undesirable from the aspect of security because the local address for the card of the communication apparatus may flow out into the network.

SUMMARY

According to an aspect of an embodiment, there is provided a communication apparatus for transmitting data through a plurality of data-paths. The communication apparatus includes: a first card connected to another communication apparatus through a first route connected to the first card; a second card connected to another communication apparatus through a second route connected to the second card; and a card-to-card link connecting the first and second cards within the communication apparatus. One of the first and second cards is determined to be a primary card that controls transmission of data between the communication apparatus and another communication apparatus, and the other one of the first and second cards is determined to be a secondary card that is operated under control of the primary card. The primary card establishes a primary data-path for transmitting primary data, using one of the first and second routes connected to the primary card. The primary card further establishes a secondary data-path for transmitting secondary data, using the card-to-card link, the secondary card, and the other one of the first and second routes connected to the secondary card.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

According to an embodiment, a communication tunnel is formed through a card-to-card link between first and second cards. This allows one of the first and second cards to perform a communication with another communication apparatus through the other one of the first and second cards using the communication tunnel, and a multi-homing communication using a plurality of data-paths can be performed with a redundant configuration of the first and second cards.

Figure 1:
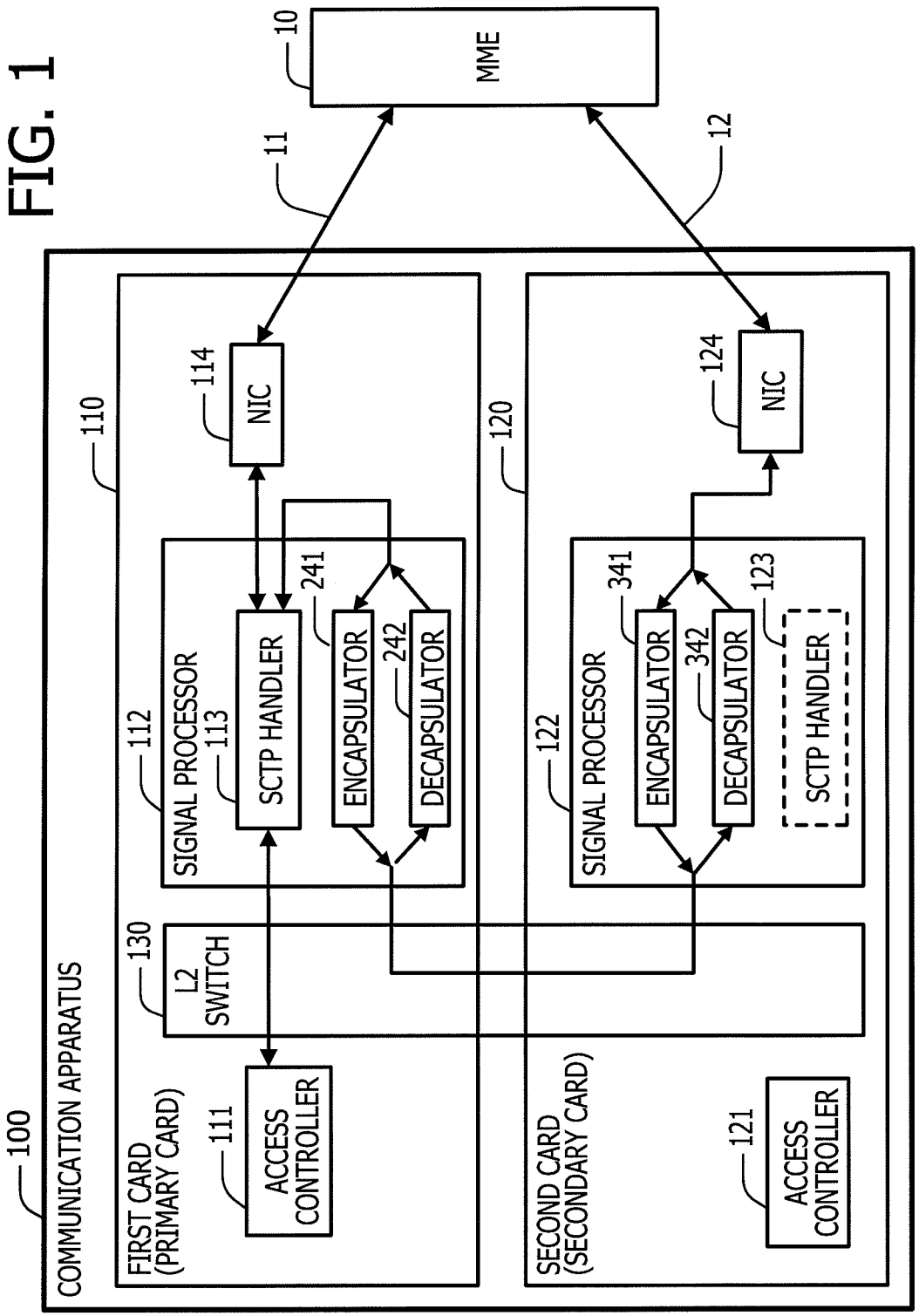
FIG. 1 is a diagram illustrating a configuration example of a communication apparatus, according to an embodiment.

FIG. 1 is a diagram illustrating a configuration example of a communication apparatus, according to an embodiment.

A communication apparatus 100 may be, for example, an evolutional Node B (eNB) that communicates with a higher level system. As depicted in FIG. 1, the communication apparatus 100 may be configured to include a first card 110, a second card 120, and a L2 switch 130. The L2 switch 130 functions as a card-to-card link between the first and second cards. The communication apparatus 100 performs transmission of data between the communication apparatus 100 and another communication apparatus (for example, a MME 10 as depicted in FIG. 1) through a first route 11 connected to the first card 110 and a second route connected to the second card 120.

A pair of one global address and one local address are assigned to each of the first and second cards 110, 120. Here, let "A" be a global address assigned to the first card 110 and let "B" be a global address assigned to the second card 120.

The first card 110 includes, for example, an access controller 111, a signal processor 112, and a NIC (network interface card) 114. The signal processor 112 may be configured to include, for example, a SCTP handler 113 as a protocol handler, an encapsulator 241, and decapsulator 242. The second card 120 includes, for example, an access controller 121, a signal processor 122, and a NIC 124. The signal processor 122 may be configured to include, for example, a SCTP handler 123 as a protocol handler, an encapsulator 341, and decapsulator 342. Here, the first card 110 and the second card 120 communicate with each other via the L2 SWITCH 130 (Layer 2 Switch) that functions as a card-to-card link between the first and second cards.

The access controller 111 is a controller for controlling the first card 110, and the access controller 121 is a controller for controlling the second card 120. Under normal conditions, one of the access controllers 111, 121 is in an active state and the other one is in a standby state. Hereafter, a card in which the access controller is in an active state is referred to as "a primary card", and a card in which the access controller is in a standby state is referred to as "a secondary card". In this case, it is assumed that, as an initial state, the access controller 111 of the first card 110 is in an active state and the access controller 121 of the second card 120 is in a standby state, in other words, the first card 110 is a primary card and the second card 120 is a secondary card.

The access controller 111 in an active state operates as a main controller for controlling both the first and second cards. That is, in this case, the first card 110 including the access controller 111 of an active state is operated as a primary card that controls both the first and second cards. The access controller 111 of the first card 110 (the primary card) may provide services, such as call control service and a handover service, in cooperation with a SCTP handler 113 of the first card 110. These services may be provided, for example, in accordance with the 3GPP/LTE.

The access controller 121 of the second card 120 (the secondary card), which is at present in a standby state, remains in the standby state until the access controller 111, which is at present in an active state, turns into an OOS (Out Of Service) state, for example, due to a failure or a maintenance operation. When the access controller 111 of the primary card 110 turns into an OOS state, the access controller 121 of the secondary card 120 shifts to an active state, in other words, the second card 120 becomes a primary card that controls both the first and second cards.

The signal processor 112 of the first card 110 may be, for example, a NWP (Network Processor) having a security function. The signal processor 112 includes a protocol handler 113 for handling a given protocol that establishes a plurality of data-paths and performs a transmission of data through the established plurality of data-paths. In the example of the FIG. 1, a SCTP is used as the given protocol, and a SCTP handler 113 that terminates the SCTP is depicted as an example of a protocol handler. The SCTP handler 113 performs a multi-homing communication with the MME 10 using a first route 11 connected to the first card 110 and a second route 12 connected to the second card 120. A multi-homing communication requires two data-paths each established along a different transmission-route. One of the two data-paths is used for transmitting primary data and hereinafter referred to as "a primary data-path". The other one of the two data-paths is used as a backup data-path for the primary data-path or may be used for transmitting secondary data, and hereinafter referred to as "a secondary data-path".

In the example depicted in FIG. 1, the primary data-path is established along a primary transmission-route that is set to connect the SCTP handler 113, a NIC 114, and a first route 11 connected to the first card 120. Further, the secondary data-path is established along a secondary transmission-route that is set to connect the SCTP handler 113, the encapsulator 241 and the decapsulator 242 of the signal processor 112, the L2 switch 130 (a card-to-card link), the encapsulator 341 and the decapsulator 342 of the signal processor 122, a NIC 124, and a second route 12 connected to the second card 120.

In the example of FIG. 1, when establishing two data-paths from the SCTP handler 113 to the MME 10, the SCTP handler 113 issues two connection requests (INIT) to the MME 10, notifying the MME 10 of the global address "A" assigned to the first card 110 and the global address "B" assigned to the second card 120.

Thereafter, upon receiving an acknowledge (ACK) from the MME 10, the SCTP handler 113 of the first card 110 starts a multi-homing communication with MME 10. The SCTP handler 113 monitors each state of the primary and secondary data-paths, and determines one of the primary and secondary data-paths to be a data-path through which primary data is to be transmitted. For example, the SCTP handler 113 transmits primary data through the primary data-path under normal conditions, and determines the existing secondary data-path to be a new primary data-path when a failure has occurred in the existing primary data-path so as to transmit the primary data through the new primary data-path.

The primary card 110 sets a primary transmission-route through which a primary data-path is to be established, and sets a secondary transmission-route through which a secondary data-path is to be established. In the case, the primary data-route is set as a route, from the SCTP handler 113 to the MME 10, that passes through the NIC 114 and the first-route 11 connected to the first card 110, as mentioned above. The secondary transmission-route is set as a route, from the SCTP handler 113 to the MME 10, that passes through the L2 switch 130, the signal processor 122, and the NIC 124, as mentioned above.

The SCTP handler 113 of the first card 110 (a primary card) sends primary data to the MME 10 through the primary data-path that is established along the primary transmission-route. For example, the signal processor 112 of the first card 110 transmits the primary data to the MME 10 through the primary data-path using, as a source address of the primary data, the global address "A" assigned to the first card 110.

The SCTP handler 113 of the first card 110 (a primary card) sends secondary data to the MME 10 through the secondary data-path that is established along the secondary transmission-route. For example, the signal processor 112 of the first card 110 encapsulates the secondary data, and transfers the encapsulated secondary data to the second card 120 (a secondary card) via the card-to-card link (in the case, the L2 switch 130). In the case, the signal processor 112 of the first card 110 may be configured to transfer the encapsulated secondary data to the secondary card 120 using, as a destination address of the secondary data, the local address "b" assigned to the second card 120. Upon receiving the encapsulated secondary data from the first card 110, the signal processor 122 of the second card 120 decapsulates the received encapsulated secondary data. In the case, the signal processor 122 of the second card 120 may be configured to receive secondary data that is transferred from the first card 110 using, as a destination address of the secondary data, the local address "b" assigned to the second card 120. Next, signal processor 122 of the second card 120 transmits the decapsulated secondary data, that sis, the original secondary data to the MME 10 via NIC 124 through the second route 12 connected to the second card 120. In the case, the signal processor 122 may be configured to transmit the secondary data using, as a source address of the secondary data, the global address "B" assigned to the second card 120.

The SCTP handler 113 of the first card 110 (a primary card) receives primary data that is transmitted from MME 10 through the primary data-path. In the case, the signal processor 112 may be configured to receive the primary data using, as a destination address of the primary data, the global address "A" assigned to the first card 110.

The SCTP handler 113 of the first card 110 (a primary card) receives secondary data that is transmitted from MME 10 through the secondary data-path. For example, the signal processor 122 of the second card 120 receives secondary data that is transmitted from MME 10 through the second route 12 connected to the second card 120. In the case, the signal processor 122 may be configured to receive the secondary data using, as a destination address of the secondary data, the global address "B" assigned to the second card 120. Next, the signal processor 122 encapsulates the received secondary data, and transfer the encapsulated secondary data to the first card 110 via the card-to-card link (the L2 switch 130). In the case, the signal processer 122 may be configured to transfer the encapsulated secondary data to the first card 110 using, as a destination address of the secondary data, the local address "a" assigned to the first card 110. Upon receiving the encapsulated secondary data from the second card 120, the signal processor 112 of the first card 110 decapsulates the encapsulated secondary data. Next, the decapsulated secondary data, that is, the original secondary data is sent to the SCTP handler 113. In the case, the signal processor 112 of the first card 110 may be configured to receive secondary data that is transferred from the second card 120 using, as a destination address of the secondary data, the local address "a" assigned to the first card 110.

A signal processor 122 of the second card 120 is, for example, a NWP having a security function. The signal processor 122 includes a SCTP handler 123 that terminates SCTP. In the example depicted in FIG. 1, the SCTP handler 123 of the second card 120 is not activated, as depicted with dotted lines in FIG. 1, since the access controller 121 of the second card 120 is in a standby state, in other words, the second card 120 is a secondary card.

As mentioned above, the L2 switch 130 functions as a card-to-card link through which a communication tunnel is formed so that secondary data is transferred between the first card 110 (a primary card) and the second card 120 (a secondary card). The first card 110 and the second card 120 transfer the encapsulated secondary data to each other via the communication tunnel formed through the L2 switch 130. According to the way mentioned above, data can be transferred between the first and second cards more efficiently than the case where NAT (Network Address Translation) or NAPT (Network Address Port Translation) are employed.

Further, as mentioned above, the primary card 110 performs a transmission of primary data between the primary card 110 and another communication apparatus (for example, the MME 10) through a primary data-path that is established along the primary transmission-route. At the same time, the primary card 110 performs a transmission of secondary data between the primary card 110 and another communication apparatus (for example, the MME 10) through a secondary data-path that is established along the secondary transmission-route. The secondary transmission-route may be set as a transmission-route from the protocol handler of the primary card (for example, the SCTP handler 113) to another communication apparatus (for example, the MME 10) that passes through a card-to-card link (for example, the L2 switch 130), the secondary card 120, and a second route 12 connected to the secondary card 120. Thus, the communication apparatus 100 may be configured to concurrently transmit both primary and secondary data between a communication apparatus and another communication apparatus, using a plurality of data-paths: a primary data-path and a secondary data-path.

In the example depicted in FIG. 1, a MME 10 indicates a Mobility Management Entity (MME) that is a node positioned at a higher level than a base station (such as eNB) in a hierarchical network. The MME 10 performs a mobility control, such as paging and managing areas in which a location of a terminal is to be registered. In the case, for example, two global addresses "C" and "D" are assigned to MME 10 in order to transmit primary and secondary data between the communication apparatus 100 and the MME 10 through two data-paths.

From the view point of the MME 10, the communication apparatus 100 has two global addresses: "A" and "B". In the case, the MME 10 can transmit primary data to the communication apparatus 100 through primary data-path using as a destination address the global address "A" assigned to the primary card 110, and transmit the secondary data to the communication apparatus 100 through the secondary data-path using as a destination address the global address "B" assigned to the secondary card 120.

Figure 2:
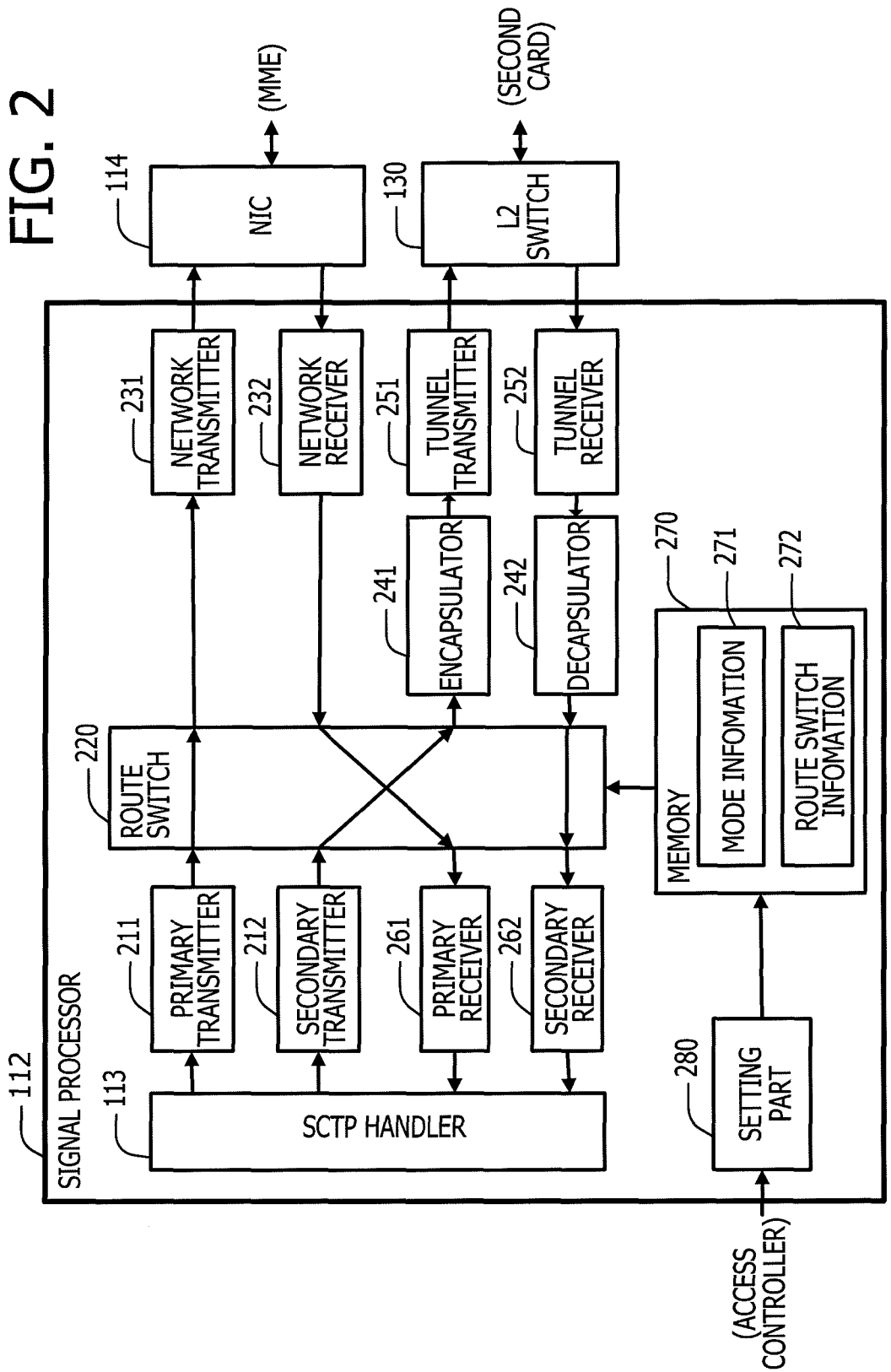
FIG. 2 is a block diagram illustrating a configuration example of a signal processor of a primary card, according to an embodiment.

FIG. 2 is a block diagram illustrating a configuration example of a signal processor of a primary card, according to an embodiment. In FIG. 2, it is assumed that the first card 110 is a primary card and the second card 120 is a secondary card. As depicted in FIG. 2, the signal processor 112 of the first card 110 may be configured to include a SCTP handler 113, a primary transmitter 211, a secondary transmitter 212, a route switch 220, a network transmitter 231, a network receiver 232, an encapsulator 241, a decapsulator 242, a tunnel transmitter 251, a tunnel receiver 252, a primary receiver 261, a secondary receiver 262, a memory 270, and a setting part 280.

The SCTP handler 113 sends, to the primary transmitter 211, primary data that is to be transmitted from the communication apparatus 100 through a primary data-path, and sends, to the secondary transmitter 212, secondary data that is to be transmitted from the communication apparatus 100 through a secondary data-path. Further, the SCTP handler 113 performs SCTP terminating process, on primary data received from the primary receiver 261 and on secondary data received from the secondary receiver 262.

The primary transmitter 211 and the secondary transmitter 212 send data received from the SCTP handler 113, to the route switch 220.

The route switch 220 reads out a route switch information 272 from the memory 270, and switches a connection route through which data is conveyed. Since the first card 110 is a primary card in the case, the route switch 220 sends primary data received from the primary transmitter 211 to the network transmitter 231, and sends secondary data received from the secondary transmitter 212 to the encapsulator 241. Further, the route switch 220 sends primary data received from the network receiver 232 to the primary receiver 261, and sends secondary data received from the decapsulator 242 to the secondary receiver 262.

The network transmitter 231 transmits primary data received from the route switch 220 to a MME 10 via a NIC 114. The network receiver 232 receives primary data transmitted from the MME 10 via the NIC 114, and sends the received primary data to the route switch 220.

The encapsulator 241 encapsulates secondary data received from the route switch 220, and sends the encapsulated secondary data to the tunnel transmitter 251. The decapsulator 242 decapsulates secondary data received from the tunnel receiver 252, and sends the decapsulated secondary data to the route switch 220.

The tunnel transmitter 251 transfers secondary data received from the encapsulator 241 to the second card 120 via the L2 switch 130. The tunnel receiver 252 receives secondary data that has been transferred from the second card 120 via the L2 switch 130, and sends the received secondary data to the decapsulator 242.

The primary receiver 261 sends primary data received from the route switch 220 to the SCTP handler 113, and the secondary receiver 262 sends secondary data received from the route switch 220 to the SCTP handler 113.

The memory 270 stores mode information 271 and route switch information 272. The mode information 271 is information indicating an operating mode of the first card 110. Operating modes includes a primary mode, a secondary mode, and an out of service (OOS) mode. The primary mode, the secondary mode, and the OOS mode mean that the access controller of the own card is in an active state, a standby state, and an OOS state, respectively. In the example depicted in FIG. 2, the mode information 271 indicates a primary mode. The route switch information 272 is information indicating a state of route connections that are switched by the route switch 220. The setting part 280 sets values to the mode information 271 and the route switching information 272 under control of the access controller 111 of the first card 110 and the access controller 121 of the second card 120.

Figure 3:
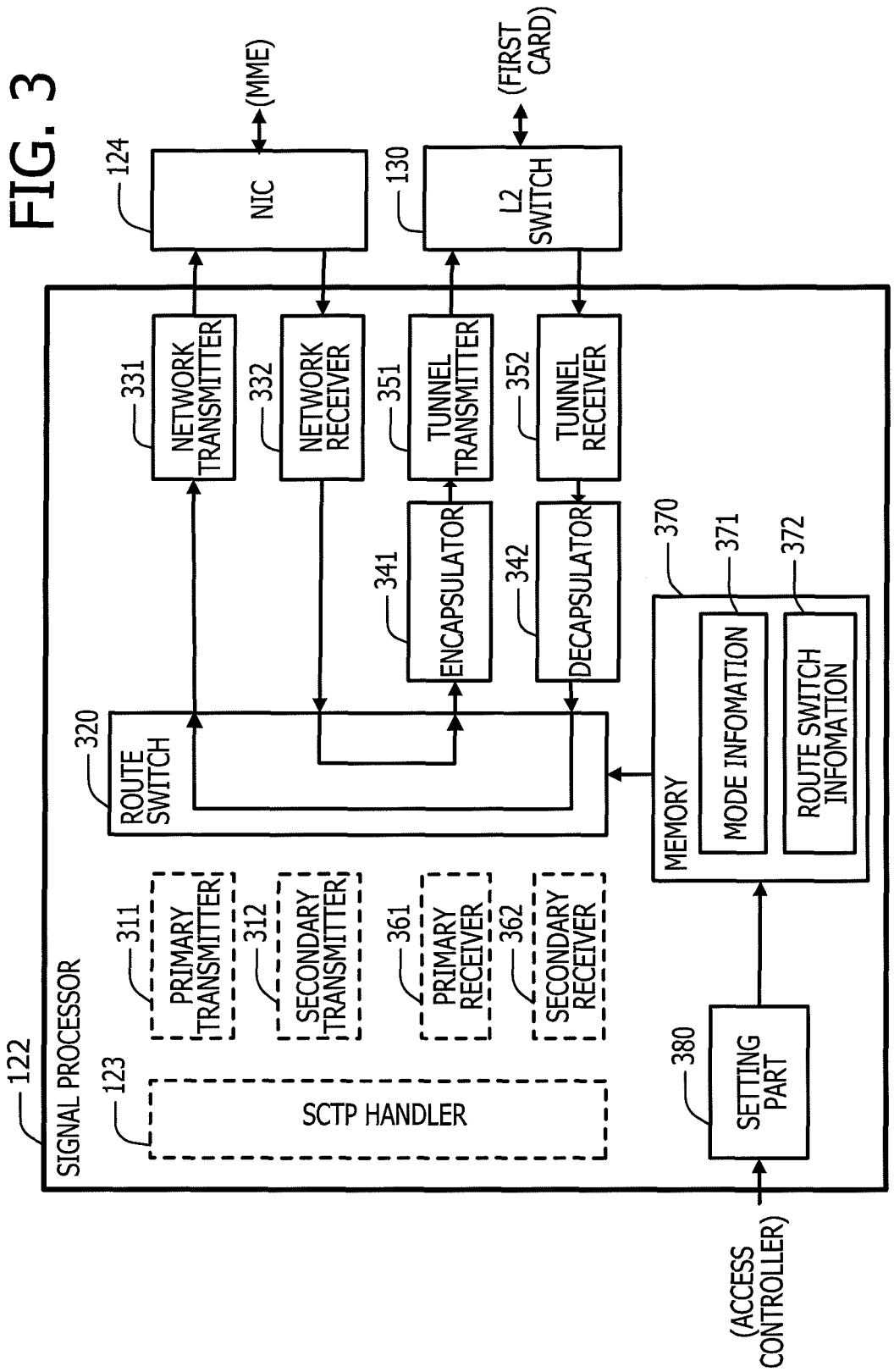
FIG. 3 is a block diagram illustrating a configuration example of a signal processor of a secondary card, according to an embodiment.

FIG. 3 is a block diagram illustrating a configuration example of a signal processor of a secondary card, according to an embodiment. In FIG. 3, it is assumed that the first card 110 is a primary card and the second card 120 is a secondary card. As depicted in FIG. 3, the signal processor 122 of the second card 120 may be configured to include a SCTP handler 123, a primary transmitter 311, a secondary transmitter 312, a route switch 320, a network transmitter 331, a network receiver 332, an encapsulator 341, a decapsulator 342, a tunnel transmitter 351, a tunnel receiver 352, a primary receiver 361, a secondary receiver 362, a memory 370, and a setting part 380.

In this case, it is assumed that the access controller 121 of the second card 120 is in a standby state. Therefore, the SCTP handler 123, the primary transmitter 311, the secondary transmitter 312, the primary receiver 361, and the secondary receiver 362 of the second card 120 are not operating, as depicted with dotted lines in FIG. 3.

The route switch 320 reads out route switch information 372 from the memory 370, and switches a route connection via which data is to be conveyed based on the rout switch information 372. For example, the route switch 320 set a route connection so that secondary data received from the network receiver 332 is transferred to the encapsulator 341, and secondary data received from the decapsulator 342 is transferred to the network transmitter 331.

The network transmitter 331 transmits the secondary data received from the route switch 320 to the MME 10 via the NIC 124, and the network receiver 332 receives the secondary data transmitted from the MME 10 via the NIC 124, and sends the received secondary data to the route switch 320.

The encapsulator 341 encapsulates the secondary data received from the route switch 320, and sends the encapsulated secondary data to the tunnel transmitter 351. The decapsulator 342 decapsulates the secondary data received from the tunnel receiver 352, and sends the decapsulated secondary data to the route switch 320.

The tunnel transmitter 351 transfers the secondary data received from the encapsulator 341 to the first card 110 via the L2 switch 130. The tunnel receiver 352 receives the secondary data transferred from the first card 110 via the L2 switch 130, and sends the received secondary data to the decapsulator 342.

The memory 370 stores mode information 371 and route switch information 372. The mode information 371 is information indicating an operating mode of the second card 120. In the case, the mode information 371 indicates a secondary mode meaning that the access controller 121 of the second card 120 is in a standby state. The route switch information 372 is information indicating a state of route connections switched by the route switch 320. The setting part 380 sets values to the mode information 371 and the route switch information 372, under control of the access controller 111 of the first card 110 and the access controller 121 of the second card 120.

According to the above mentioned data flows of the primary and secondary data, as depicted in FIGS. 2 and 3, the primary transmission-route along which a primary data-path is to be established may be set by the route switch 220 of the primary card 110 and the route switch 320 of the secondary card 120. Similarly, the secondary transmission-route along which a secondary data-path is to be established may be set by the route switch 220 of the primary card 110 and the route switch 320 of the secondary card 120. Thereafter, the SCTP handler 113 of the primary card 110 establishes a primary data-path through which primary data is to be transmitted, along the primary transmission-route, and establishes a secondary data-path through which primary data is to be transmitted, along the secondary transmission-route. As mentioned above, a multi-homing communication may be performed between the communication apparatus 100 and another communication apparatus (such as the MME 10) using two different cards (primary and secondary cards) included in the communication apparatus 100.

Figure 4:
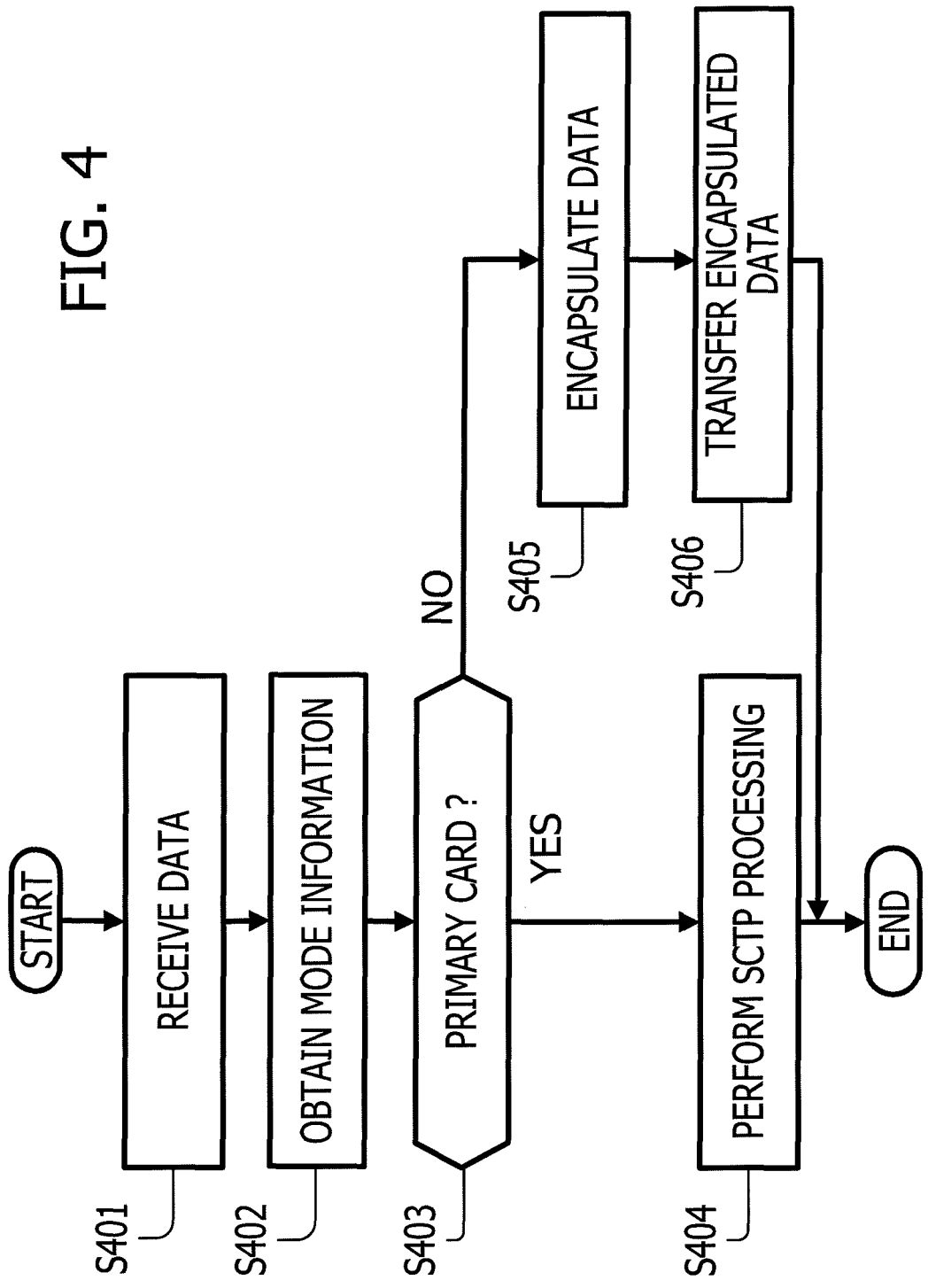
FIG. 4 is a diagram illustrating an example of an operational flowchart of primary and secondary cards, according to an embodiment.

FIG. 4 is a diagram illustrating an example of an operational flowchart of primary and secondary cards, according to an embodiment. Each of the primary card 110 and the secondary card 120, upon receiving data from the MME 10, performs the following operations.

First, one of primary and secondary cards receives data that is transmitted from the MME 10 (in step S401), and obtains mode information from the memory (in step S402). Next, it is determined whether or not the own card is a primary card (in a primary mode), based on the obtained mode information (in step S403).

When it is determined that the own card is a primary card (YES in step S403), SCTP processing is performed on the data received in step S401 (in step S404), and processing is ended. When it is determined that the own card is not a primary card (NO in step S403), the data received in step S401 is encapsulated (in step S405), and the encapsulated data is transferred to the other one of the primary and secondary cards (in step S406), and processing is ended.

The following is an example of operational steps of a first card 110. The first card 110 reads out mode information 271 from a memory 270 (in step S402), and determines, in this case, that the own card (first card 110) is a primary card since the mode information 271 indicates a primary mode (in step S403). Then, the first card 110 performs SCTP processing on the received data since the first card 110 is a primary card (in step S404).

The following is an example of operational steps of a second card 120. The second card 120 reads out mode information 371 from a memory 370 (in step S402), and determines, in this case, that the own card (second card 120) is a secondary card since the mode information 371 indicates a secondary mode (in step S403). Then, the second card 120 (secondary card) encapsulates the received data (in step S405), and transfers the encapsulated data to the primary card 110 (in step S406).

According to the above steps, when primary data is transmitted from the MME 10 to the first card 110 using as a destination address a global address "A" assigned to the first card 110, SCTP processing on the received primary data is performed by the first card 110. Further, when secondary data is transmitted from the MME 10 to the second card 120 using as a destination address a global address "B" assigned to the second card 120, the received secondary data is transferred from the second card 120 to the first card 110 via a card-to-card link (the L2 switch 130), and then the SCTP processing on the secondary data is performed by the first card 110. Thus, the primary card (in the case, the first card 110) may be configured to perform SCTP processing on both the primary and secondary data that are transmitted from the MME 10 to the communication apparatus 100 through the two data-paths.

Figure 5:
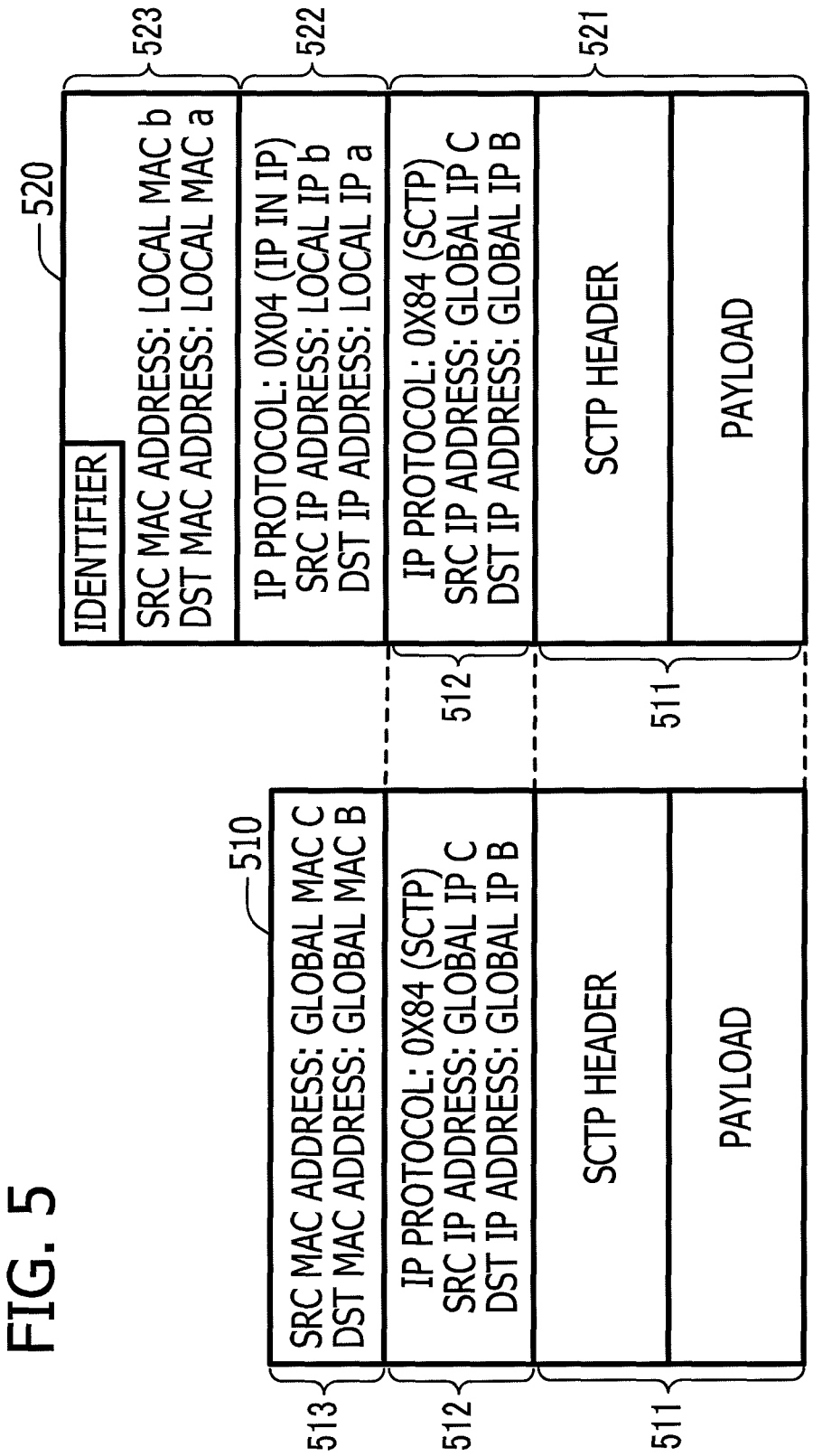
FIG. 5 is a schematic diagram illustrating an example of data encapsulated by a secondary card, according to an embodiment.

FIG. 5 is a schematic diagram illustrating an example of data encapsulated by a secondary card, according to an embodiment. In FIG. 5, data 510 indicates secondary data that is transmitted from a MME 10 and received by the secondary card 120. Data 520 is obtained by encapsulating the data 510. The data 510 includes SCTP data 511 storing a SCTP header and a payload, an IP header 512, and a L2 header 513.

In the example depicted in FIG. 5, the IP header 512 indicates that a source IP address of the data 510 (denoted by "SRC IP ADDRESS") is a global address "C" (denoted by "GLOBAL IP C") assigned to the MME 10, and that a destination IP address of the data 510 (denoted by "DST IP ADDRESS") is a global address "B" (denoted by "GLOBAL IP B") assigned to the secondary card 120.

Further, in the example depicted in FIG. 5, the L2 header 513 indicates that a source MAC address (denoted by "SRC MAC ADDRESS") is a global address "C" (denoted by "GLOBAL MAC C") assigned to the MME 10, and that a destination MAC address (denoted by "DST MAC ADDRESS") is a global address "B" (denoted by "GLOBAL MAC B") assigned to the second card 120.

The secondary card 120 encapsulates the data 510 by removing the L2 header 513 from the data 510 and by adding an IP header 522 and a L2 header 523 to the data 510 from which the L2 header 513 has been removed, to generate the data 520. Further, the secondary card 120 inserts into the L2 header 523 an identifier indicating that the data 520 is to be transferred through a communication tunnel set through the card-to-card link between the primary and secondary cards.

In the example depicted in FIG. 5, the IP header 522 indicates that a source IP address (denoted by "SRC IP ADDRESS") is a local address "b" (denoted by "LOCAL IP b") assigned to the second card 120, and that a destination IP address (denoted by "DST IP ADDRESS") is a local address "a" (denoted by "LOCAL IP a") assigned to the first card 110.

Further, the IP header 523 indicates that a source MAC address (denoted by "SRC MAC ADDRESS") is a local address "b" (denoted by "LOCAL MAC b") assigned to the second card 120, and that a destination MAC address (denoted by "DST MAC ADDRESS") is a local address "a" (denoted by "LOCAL MAC a") assigned to the first card 110.

Figure 6:
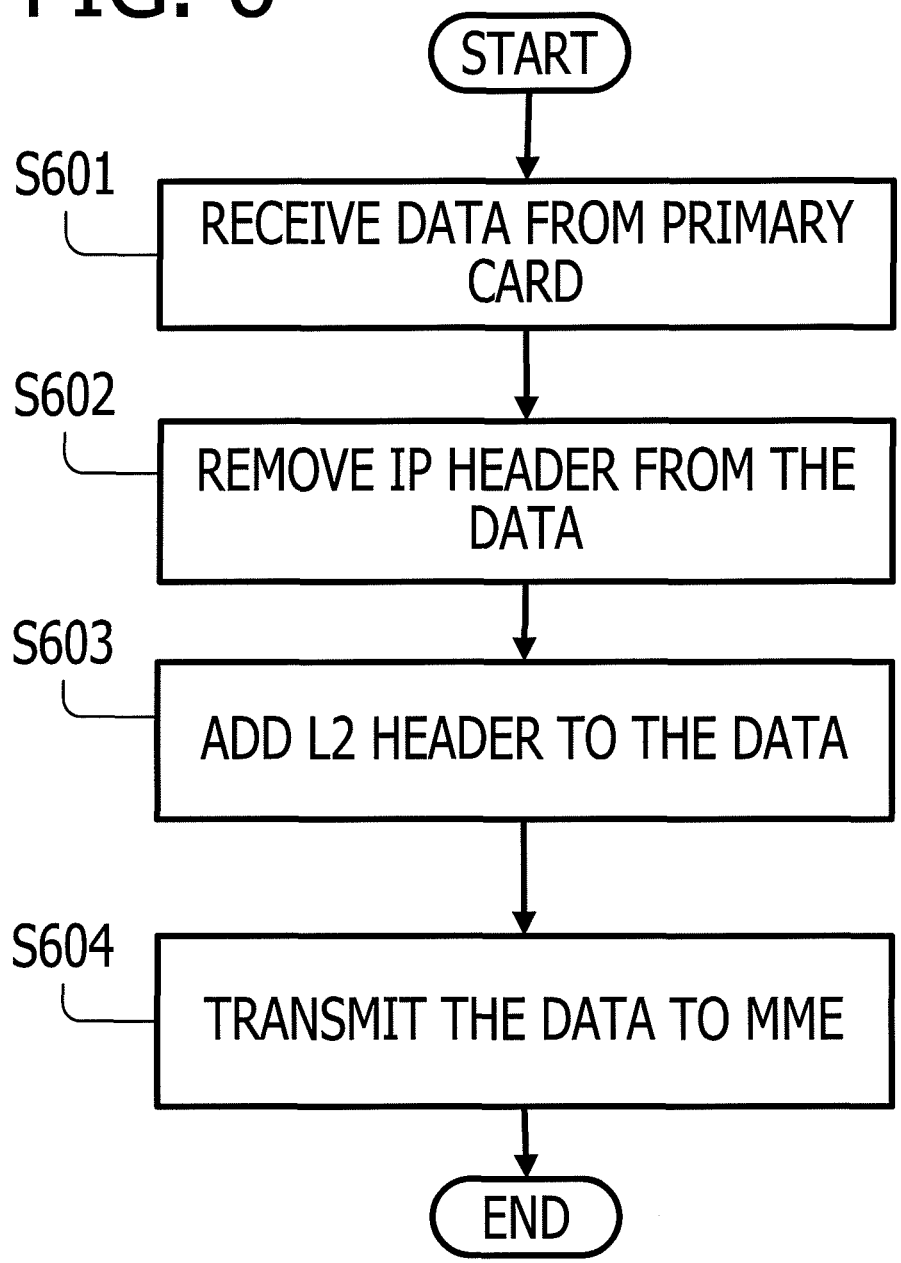
FIG. 6 is a diagram illustrating an example of an operational flowchart of a secondary card when transmitting secondary data to another communication apparatus, according to an embodiment.

FIG. 6 is a diagram illustrating an example of an operational flowchart of a secondary card when transmitting secondary data to another communication apparatus, according to an embodiment. When a first card 110 (a primary card) transfers secondary data to a second card 120 (a secondary card), the second card 120 performs the following operations so as to transmit the received secondary data to another communication apparatus.

First, the second card 120 receives secondary data transferred from a primary card of the first card 110 (in step S601), and then removes the IP header from the secondary data received in step S601 (in step S602). Next, a secondary card of the second card 120 adds a L2 header to the secondary data from which the IP header has been removed in step S602 (in step S603), and then transmits to the MME 10 the secondary data to which the L2 header has been added, in step S604.

Figure 7:
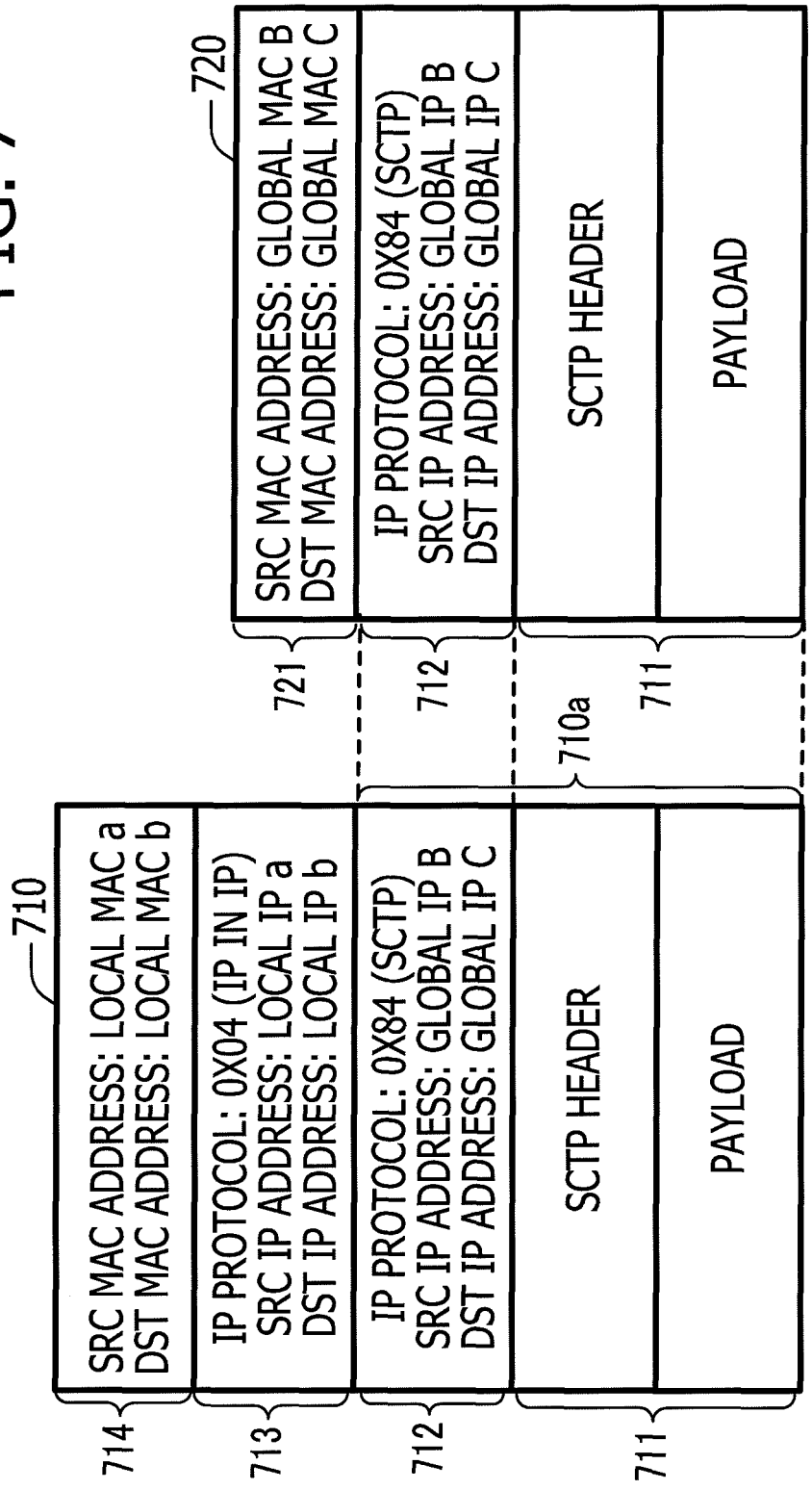
FIG. 7 is a schematic diagram illustrating an example of data decapsulated by a secondary card, according to an embodiment.

FIG. 7 is a schematic diagram illustrating an example of data decapsulated by a secondary card, according to an embodiment. In the example of FIG. 7, data 710 is data received by the secondary card 120 in step S601 of FIG. 6, and data 720 is data decapsulated by the secondary card 120 in steps S602 and S603 of FIG. 6.

The data 710 includes an IP encapsulated part 710a, an IP header 713, and a L2 header 714. The IP encapsulated part 710a, which is a part encapsulated by the primary card, includes SCTP data 711 and an IP header 712, and the SCTP data 711 includes a payload and a SCTP header.

In the example depicted in FIG. 7, the IP header 712 indicates that a source IP address (denoted by "SRC IP ADDRESS") is a global address "B" (denoted by "GLOBAL IP B") assigned to the second card 120, and that a destination IP address (denoted by "DST IP ADDRESS") is a global address "C" (denoted by "GLOBAL IP C") assigned to the MME 10.

In the example depicted in FIG. 7, the IP header 713 indicates that a source IP address (denoted by "SRC IP ADDRESS") is a local address "a" (denoted by "LOCAL IP a") assigned to the first card 110, and that a destination IP address (denoted by "DST IP ADDRESS") is a local address "b" (denoted by "LOCAL IP b") assigned to the second card 120.

The L2 header 714 indicates that a source MAC address (denoted by "SRC MAC ADDRESS") is a local address "a" (denoted by "LOCAL MAC a") assigned to the first card 110, and that a destination MAC address (denoted by "DST MAC ADDRESS") is a local address "b" (denoted by "LOCAL MAC b") assigned to the second card 120.

The second card 120 performs decapsulation by removing the IP header 713 from the data 710 and adding the L2 header 721 in replacement of the L2 header 714, so as to generate the data 720.

In the example depicted in FIG. 7, the L2 header 721 indicates that a source MAC address (denoted by "SRC MAC ADDRESS") is a global address "B" (denoted by "GLOBAL MAC B") assigned to the second card 120, and that a destination MAC address (denoted by "DST MAC ADDRESS") is a global address "C" (denoted by "GLOBAL MAC C") assigned to the MME 10.

Figure 8:
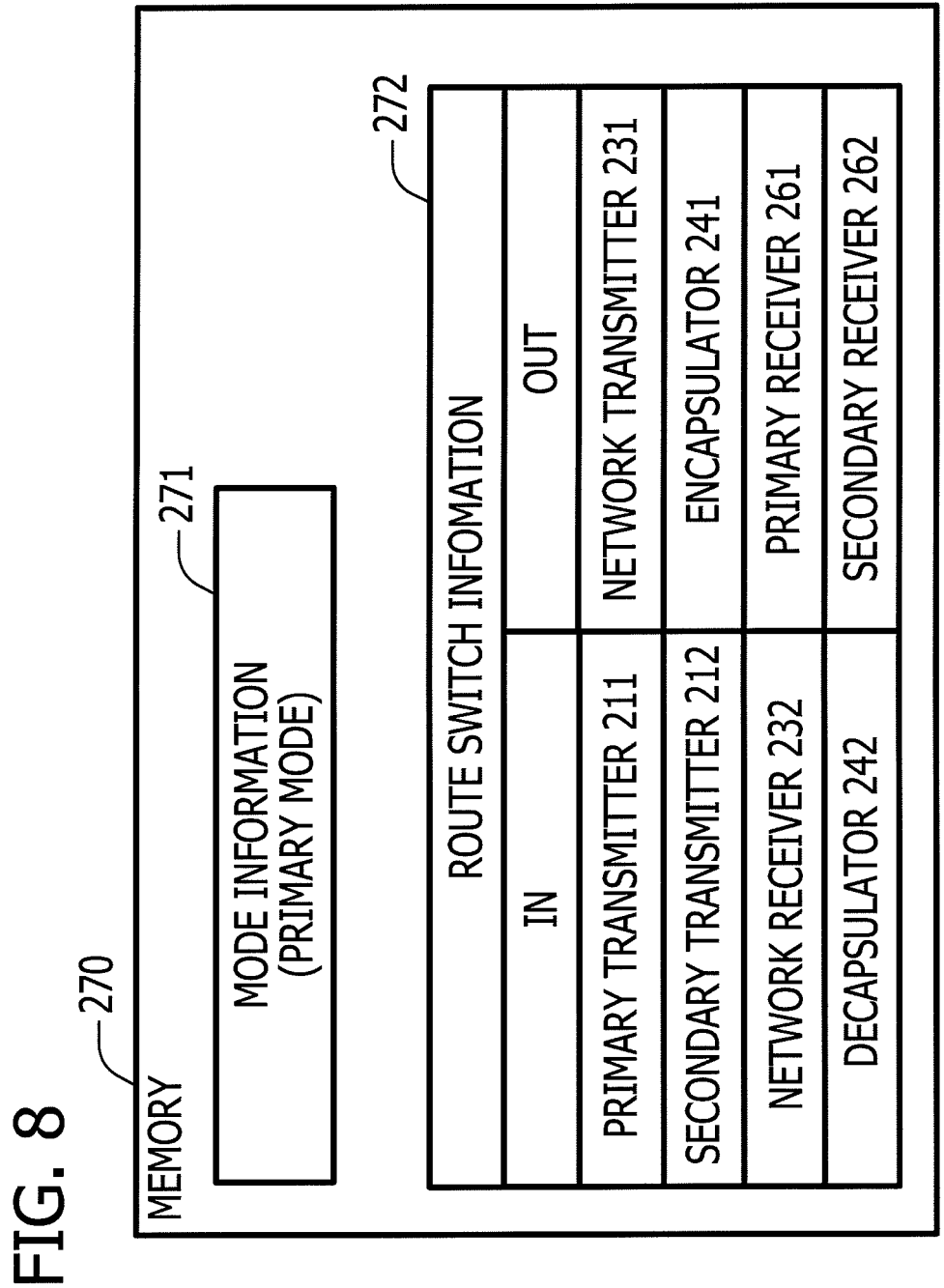
FIG. 8 is a diagram illustrating an example of information stored in a memory of a primary card, according to an embodiment.

FIG. 8 is a diagram illustrating an example of information stored in a memory of a primary card, according to an embodiment. In the example depicted in FIG. 8, the mode information 271, which is stored in the memory 270 of the first card 110, indicates a primary mode, meaning that the first card 110 is a primary card. The route switch information 272 of the memory 270 stores information on route connections controlled by the route switch 220, in which input interface information (stored in an "IN" column) of the route switch 220 is associated with output interface information (stored in an "OUT" column) of the route switch 220.

For example, in the route switch information 272, an input interface connected to the primary transmitter 211 (stored in the "IN" column) is associated with an output interface connected to the network transmitter 231 (stored in the "OUT" column), and an interface connected to the secondary transmitter 212 (stored in the "IN" column) is associated with an output interface connected to the encapsulator 241 (stored in the "OUT" column).

Further, in the route switch information 272, an input interface connected to the network receiver 232 (stored in the "IN" column) is associated with an output interface connected to the primary receiver 261 (stored in the "OUT" column), and an input interface connected to the decapsulator 242 (stored in the "IN" column) is associated with an output interface connected to the secondary receiver 262 (stored in the "OUT" column). As mentioned above, the route switch 220 of the primary card 110 may be configured to perform route switching as depicted in FIG. 3 by reading out the route switch information 272 from the memory 270 and switching a route connection via which data is to be conveyed in accordance with the route switch information 272.

Figure 9:
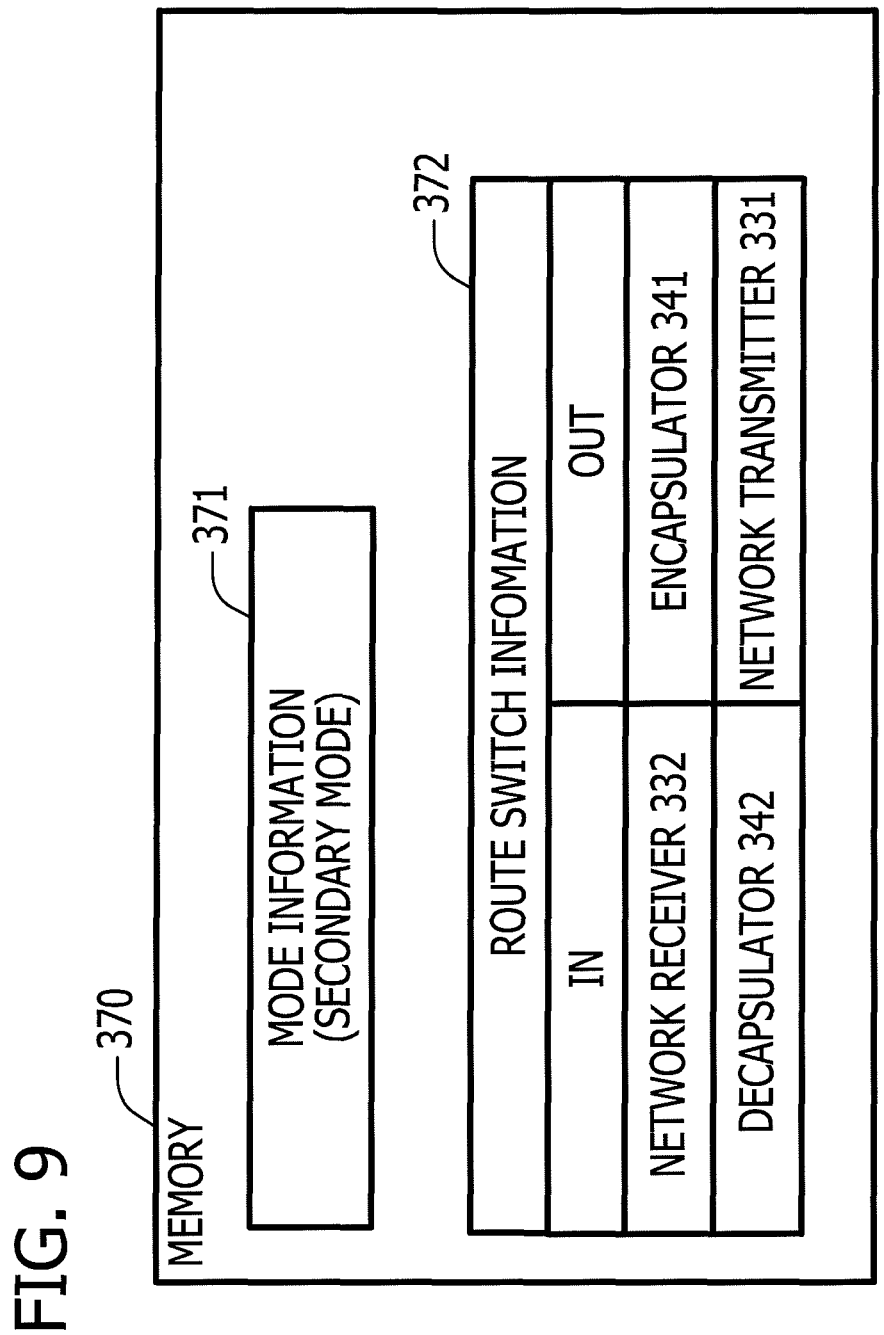
FIG. 9 is a diagram illustrating an example of information stored in a memory of a secondary card, according to an embodiment.

FIG. 9 is a diagram illustrating an example of information stored in a memory of a secondary card, according to an embodiment. In the example depicted in FIG. 9, the mode information 371, which is stored in the memory 370 of the second card 120, is indicating a secondary mode, meaning that the second card 120 is a secondary card. The route switch information 372 of the memory 370 stores information on route connections of the route switch 320, in which input interface information (stored in an "IN" column) of the route switch 320 is associated with output interface information (stored in an "OUT" column) of the route switch 320.

For example, in the route switch information 372, an input interface connected to the network receiver 332 (stored in the "IN" column) is associated with an output interface connected to the encapsulator 241 (stored in the "OUT" column), and an interface connected to the decapsulator 342 (stored in "IN" column) is associated with the network transmitter 331 (stored in the "OUT" column). As mentioned above, the route switch 320 may be configured to perform route switching as depicted in FIG. 3 by reading out the route switch information 372 from the memory 370 and switching a route connection via which data is to be conveyed in accordance with the route switch information 372.

According to the route switch information mentioned above with reference to FIGS. 8 and 9, primary and secondary transmission-routes may be set by the primary and secondary cards.

Figure 10:
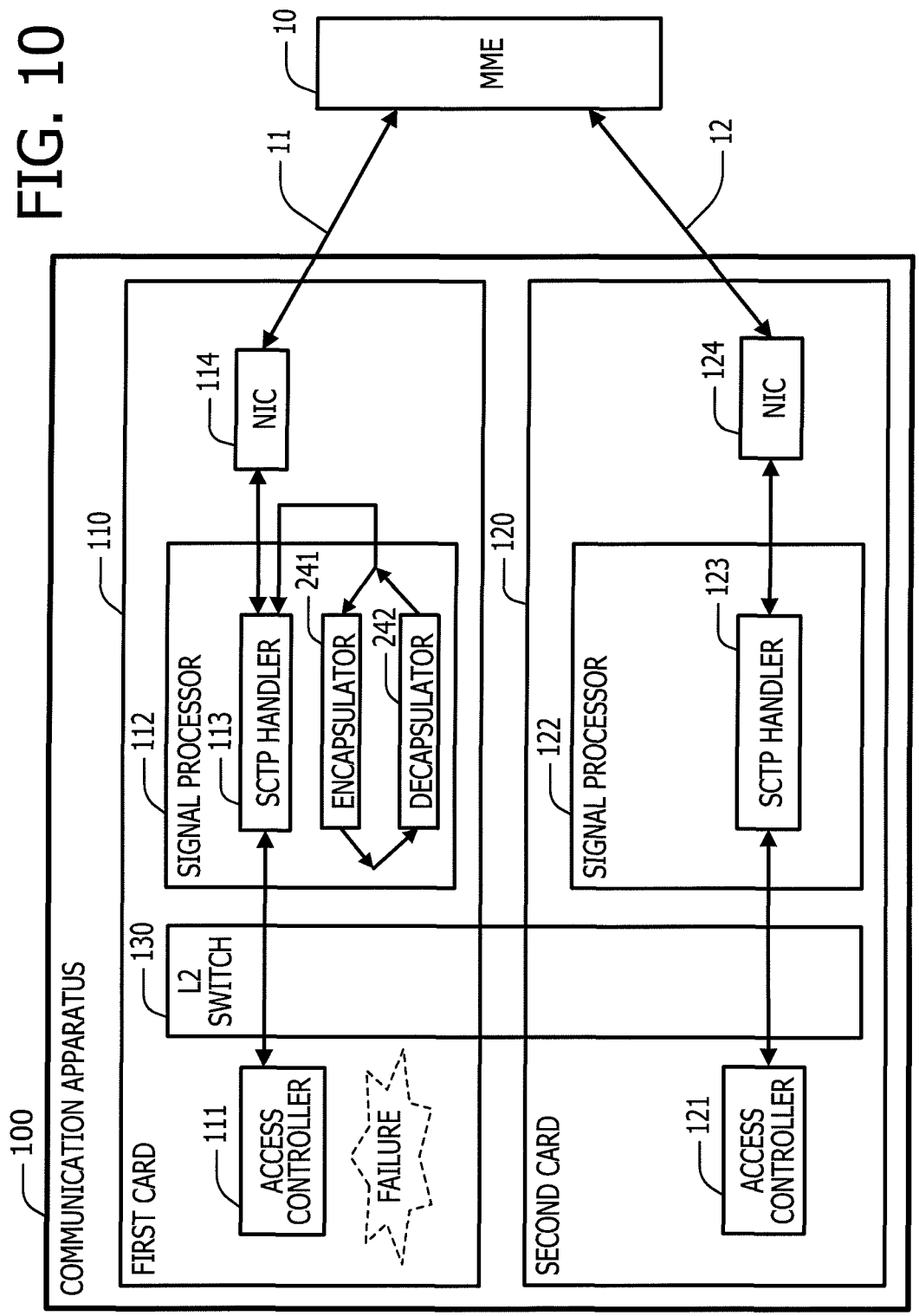
FIG. 10 is a schematic diagram illustrating an operational example of a communication apparatus when a failure has occurred in a primary card, according to an embodiment.

FIG. 10 is a schematic diagram illustrating an operational example of a communication apparatus when a failure has occurred in a primary card, according to an embodiment. In the case, it is assumed that the first card 110 is a primary card and the second card 120 is a secondary card. Further, the protocol handler (in the case, the SCTP handler 113) of the primary card 110 is performing transmission of primary data between the primary card 110 and the MME 10 through a primary data-path established along a primary transmission-route including a first route 11, while performing transmission of secondary data between the primary card 110 and the MME 10 through a secondary data-path established along a secondary transmission-route including the card-to-card link (in the case, a L2 switch 130) and a second route 12. In FIG. 10, the access controller 121 of the secondary card 120 detects a failure that has occurred in the primary card 110. The method for detecting a failure will be described later, for example, with reference to FIGS. 15 and 16.

Upon detecting a failure in the first card 110 (a primary card), the second card 120 is determined to be a new primary card. Then the access controller 121 of the second card 120 (a secondary card) changes the operating state thereof from a standby state to an active state, and invokes the signal processor 122 of the second card 120 which activates the protocol handler (in the case, the SCTP handler 123) included therein. The new primary card of second card 120 sets a new primary transmission-route connecting the SCTP handler 123, a NIC 124, and a second route 12. Thereafter, the signal processor 122 of the new primary card (the second card 120) starts a communication with the MME 10 without using a multi-homing method. That is, the signal processor 122 of the new primary card 120 establishes a new primary data-path between the new primary card 120 and the MME 10 along a new primary transmission-route, and performs transmission of primary data through the new primary data-path. In the case, since the new primary card 120 does not perform transmission of secondary data due to the failure in the first card 110, processes such as encapsulation and decapsulation which are needed for transferring secondary data between the first and second cards are not performed. As mentioned above, the communication apparatus 100 is able to maintain the communication with the MME 10 even if a failure has occurred in the existing primary card 110 of the communication apparatus 100.

Figure 11:
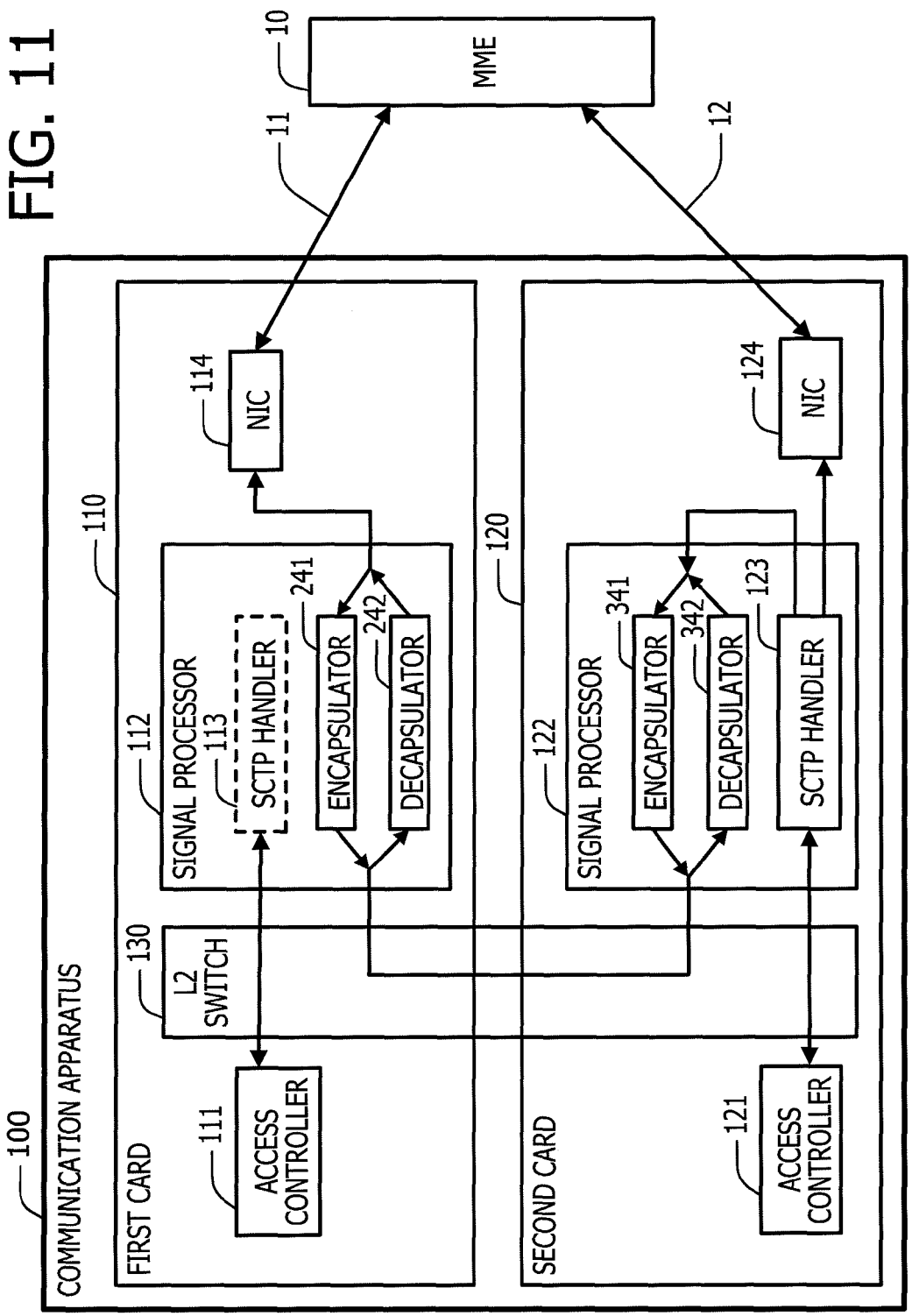
FIG. 11 is a schematic diagram illustrating an operational example of a communication apparatus when the failure has recovered, according to an embodiment.

FIG. 11 is a schematic diagram illustrating an operational example of a communication apparatus when the failure has recovered, according to an embodiment. In FIG. 11, it is assumed that the failure in the first card 110 depicted in FIG. 10 has recovered. In the case, the access controller 121 of the second card 120 (the new primary card) remains in the active state even when the failure in the first card 110 has recovered. Therefore, the access controller 121 becomes a main controller for controlling the whole communication apparatus 100. Meanwhile, the first card 110, which was not being operated due to the failure, is determined to be a secondary card, and the access controller 111 of the first card 110 changes the operational state thereof into a standby state. Further, upon detecting recovery of the first card 110 from the failure, the access controller 121 of the second card 120 (the new primary card) sets a secondary transmission-route for establishing a secondary data-path. In the case, the secondary transmission-route is set so as to connect the SCTP handler 123, the encapsulator 341 and the decapsulator 342 of the signal processor 122, the L2 switch 130 (a card-to-card link), the encapsulator 241 and the decapsulator 242 of the signal processor 112, the NIC 114, and the first route 11 connected to the first card 110. Thereafter, the second card 120 (the new primary card) performs a multi-homing communication with the MME 10 by establishing a secondary data-path along the secondary transmission-route, and by transmitting secondary data through the established secondary data-path.

As mentioned above, the SCTP handler 123 (the protocol handler) of the second card 120 establishes a secondary data-path along the secondary transmission-route, and performs a multi-homing communication with the MME 10 by transmitting the primary and secondary data through the existing primary data-path established along the existing primary transmission-route, and through the secondary data-path established along the newly-set secondary transmission-route, respectively.

Here, the SCTP handler 123 transmits primary data to the MME 10 using, as a source address thereof, a global address "B" assigned to the second card 120. Further, the signal processor 122 of the second card 120 encapsulates secondary data, and transfers the encapsulated secondary data to the first card 110 via the L2 switch 130. In the case, the signal processor 122 may be configured to transfer secondary data to the first card 110 using, as a destination address thereof, a local address "a" assigned to the first card 110.

The SCTP handler 123 of the second card 120 receives primary data that is transmitted from the MME 10 through the existing primary data-path. In the case, the signal processor 122 of the second card 120 may be configured to receive primary data that is transmitted from the MME 10 through the second route 12 using, as a destination address, a global address "B" assigned to the second card 120. Further, the SCTP handler 123 receives secondary data through the secondary data-path. For example, the signal processor 122 may be configured to receive secondary data that is transferred from the first card 110 using, as a destination address thereof, a local address "b" assigned to the second card 120.

In the case, the SCTP handler 113 of the first card 110 is not operated since the access controller 111 of the first card 110 is being in a standby state, that is, the first card 110 is a secondary card. The signal processor 112 of the first card 110 receives secondary data that is encapsulated by the second card 120 and transferred from the second card 120, and decapsulates the received secondary data. For example, the signal processor 112 may be configured to receive secondary data that is transferred from the second card 120 via the L2 switch 130 using, as a destination address, a local address "a" assigned to the first card 110. Further, the signal processor 112 transmits the decapsulated secondary data to the MME 10 via the NIC 114 through the first route 11. In the case, the signal processor 112 may be configured to transmit the decapsulated secondary data to the MME 10 using, as a source address, a global address "A" assigned to the first card 110.

Further, the signal processor 112 of the first card 110 receives secondary data transmitted from the MME 10 through the secondary data-path established along the newly-set secondary transmission-route. For example, the signal processor 112 may be configured to receive secondary data that is transmitted from the MME 10 using, as a destination address, a global address "A" assigned to the first card 110. Then, the signal processor 112 of the first card 110 encapsulates the received secondary data and transfers the encapsulated secondary data to the second card 120 via the L2 switch 130. In the case, the signal processor 112 may be configured to transfer the encapsulated secondary data to the second card 120 using, as a destination address, a local address "b" assigned to the second card 120.

Figure 12:
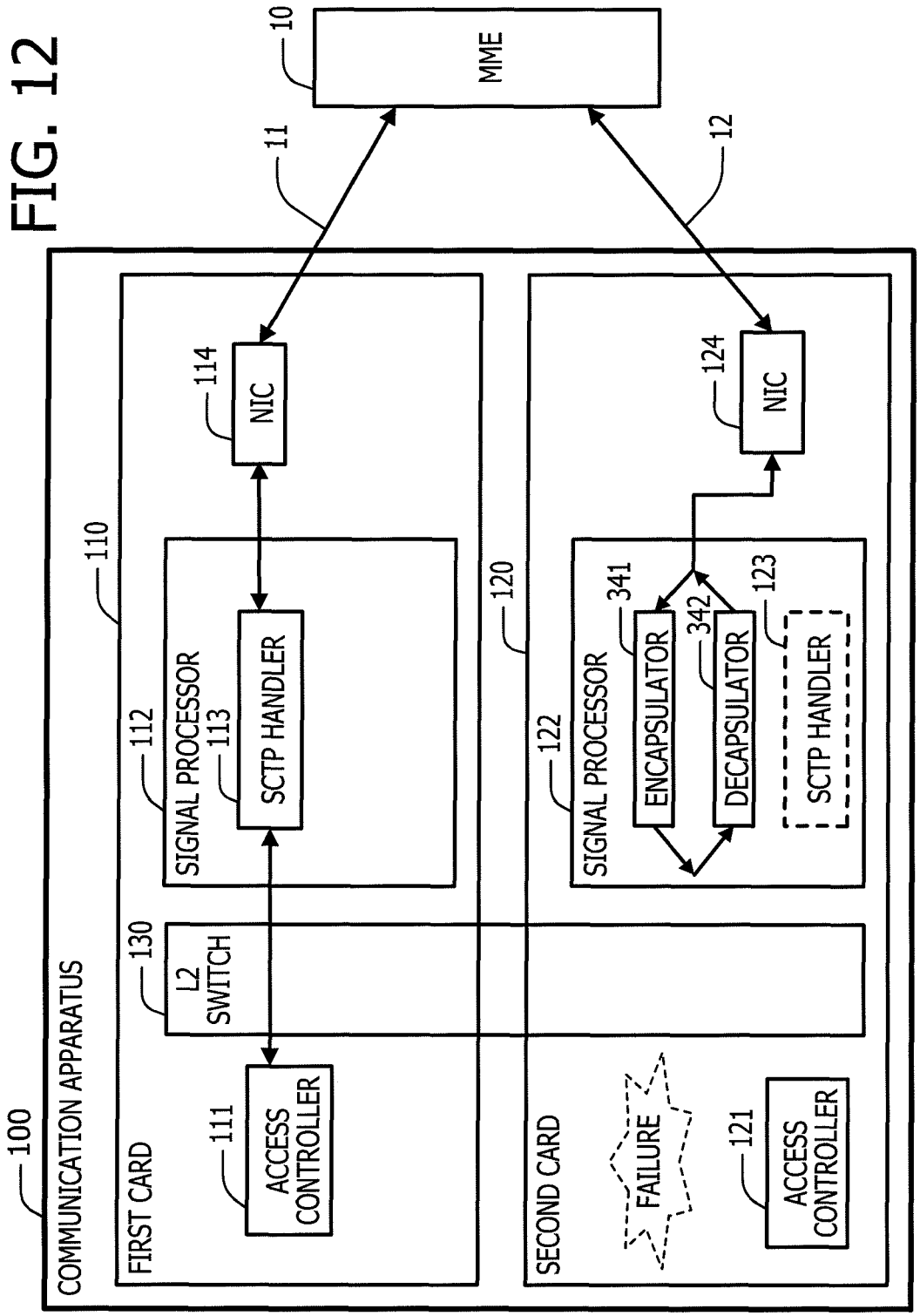
FIG. 12 is a schematic diagram illustrating an example of an operation of a communication apparatus when a failure has occurred in a secondary card, according to an embodiment.

FIG. 12 is a schematic diagram illustrating an example of an operation of a communication apparatus when a failure has occurred in a secondary card, according to an embodiment. In FIG. 12, it is assumed that a first card 110 is a primary card and a second card 120 is a secondary card. As depicted in FIG. 12, upon occurrence of a failure in the second card 120, the access controller 111 of the first card 110 (a primary card) detects the failure in the second card 120 (a secondary card). The method for detecting a failure will be described later, for example, with reference to FIGS. 15 and 16.

When the access controller 111 of the first card 110 detects a failure in the second card 120, the SCTP handler 113 of the signal processor 112 starts a communication with the MME 10 without using a multi-homing method. In the case, the SCTP handler 113 communicates with the MME 10 through the existing primary data-path established along the existing primary transmission-route that includes the NIC 114 and the first route 11. Here, processes such as encapsulation or decapsulation required for transmitting secondary data are not performed since the second card 120 is not operated properly due to the failure occurrence. In this way, the communication apparatus 100 is able to maintain a communication with the MME 10 through the existing primary data-path even though a failure has occurred in the secondary card (in the case, the second card 120).

When the failure in the secondary card (the second card 120) depicted in FIG. 12 has recovered, the access controller 111 of the first card 110 (a primary card) detects the recovery of the failure in the second card 120, and then the SCTP handler 113 of the first card 110 starts a multi-homing communication with the MME 10. In the case, since the operation of the communication apparatus 100 is similar to that depicted in FIG. 1, the detailed description thereof is skipped here.

Figure 13:
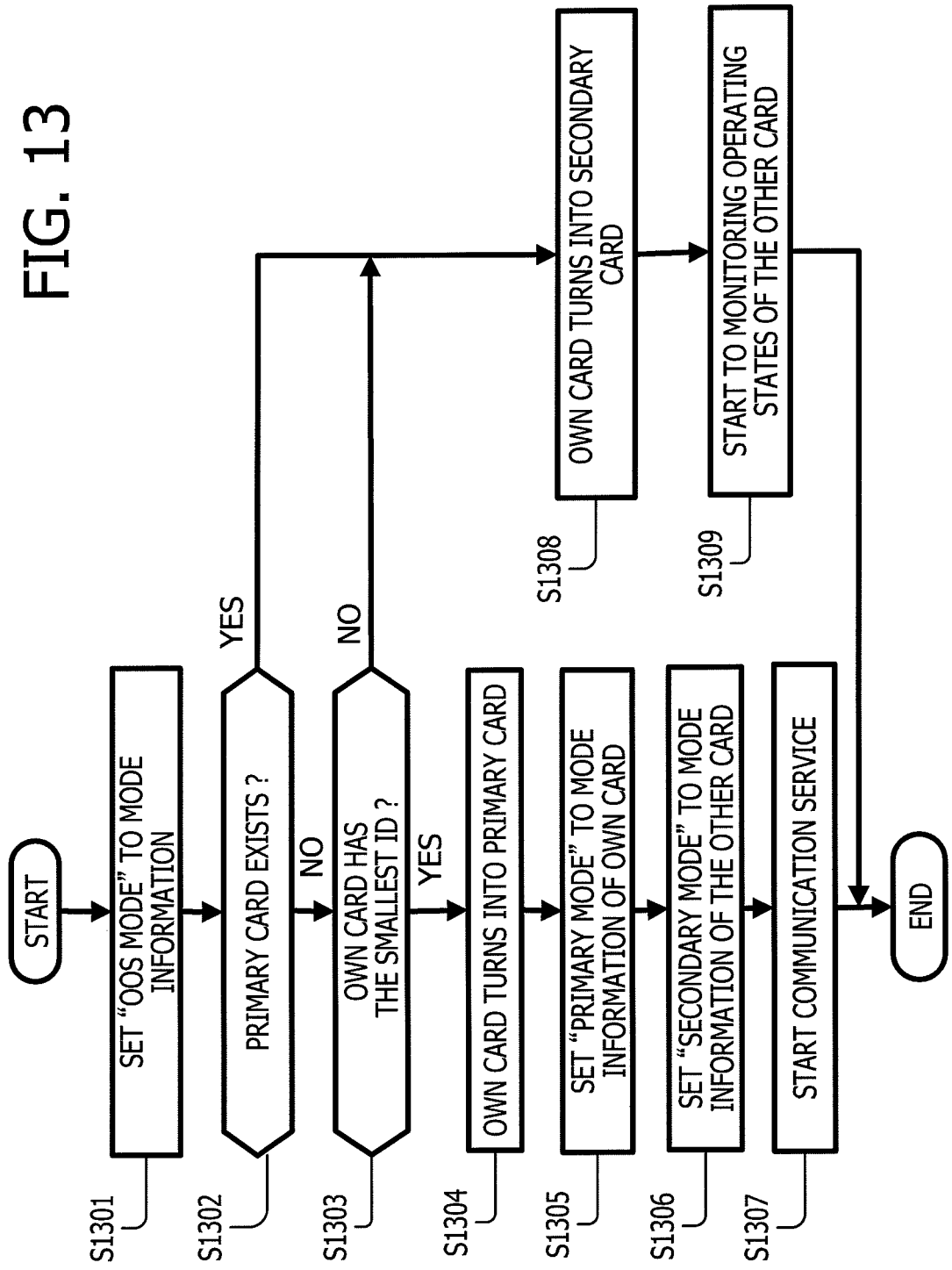
FIG. 13 is a diagram illustrating an example of an operational flowchart for starting up one of first and second cards, according to an embodiment.

FIG. 13 is a diagram illustrating an example of an operational flowchart for starting up one of first and second cards, according to an embodiment. Each of the first card 110 and the second card 120 performs the following operations at the time of startup.

First, a value indicating an "out of service" (OOS) mode is set to mode information 271 or 371 (in step S1301). Next, it is determined whether or not there exists a primary card within the communication apparatus 100 (in step S1302). When there exist no primary card within the communication apparatus 100 (NO in step S1302), it is determined whether or not the own card has the smallest ID number among all the cards within the communication apparatus 100 (in step S1303). When the own card has the smallest ID number (YES in step S1303), the own card turns into a primary card (in step S1304), and then a value indicating a primary mode is set to the mode information thereof (in step S1305).

Next, a value indicating a secondary mode is set to the mode information of the other card within the communication apparatus 100 (in step S1306), and then a communication service (for example, a communication with the MME 10) provided by the signal processor of the own card (the signal processor 112 or the signal processor 122) is started (in step S1307).

When there exists a primary card within the communication apparatus 100 (YES in step S1302) or when the own card does not have the smallest ID number among all the cards within the communication apparatus 100 (NO in step S1303), the own card turns into a secondary card (in step S1308), and starts to monitor operating states of the other card (for example, whether the other card is alive or no) within the communication apparatus 100 (in step S1309).

In FIG. 13, it is assumed that a different identification number is beforehand assigned to each of cards within the communication apparatus 100. For example, the number "1" may be assigned to the first card 110 and the number "2" may be assigned to the second card 120. In this case, the first card 110 determines that the own card has the smallest ID number among all the cards within the communication apparatus 100 (YES in step S1303), and the second card 120 determines that the own card does not have the smallest ID number among all the cards within the communication apparatus 100 (NO in step S1303).

In the case of the first card 110, a value indicating an OOS (Out Of Service) mode is set to the mode information 271 in step S1301. Further, in step S1302, the first card 110 proceeds to step S1303 when it is determined that the second card 120 is not a primary card, or proceeds to step S1308 when it is determined that the second card 120 is a primary card.

Further, the first card 110, in step S1305, sets a value indicating a primary mode to the mode information 271 in the memory 270 of the first card 110, and, in step S1306, the first card 110 sets a value indicating a secondary mode to the mode information 371 in the memory 370 of the second card 120.

In a manner similar to the first card 110, the second card 120 sets a value indicating an OOS mode to the mode information 371 in step S1301. Further, in step S1302, the second card 120 proceeds to step S1303 when it is determined that the first card 110 is not a primary card (for example, the first card 110 being a secondary card), and proceeds to step S1308 when it is determined that the first card 110 is a primary card.

Next, in step S1305, the second card 120 sets a value indicating a primary mode to the mode information 371 in the memory 370 of the second card 120, and, in step S1306, the second card 120 sets a value indicating a secondary mode to the mode information 271 in the memory 270 of the first card 110.

Figure 14:
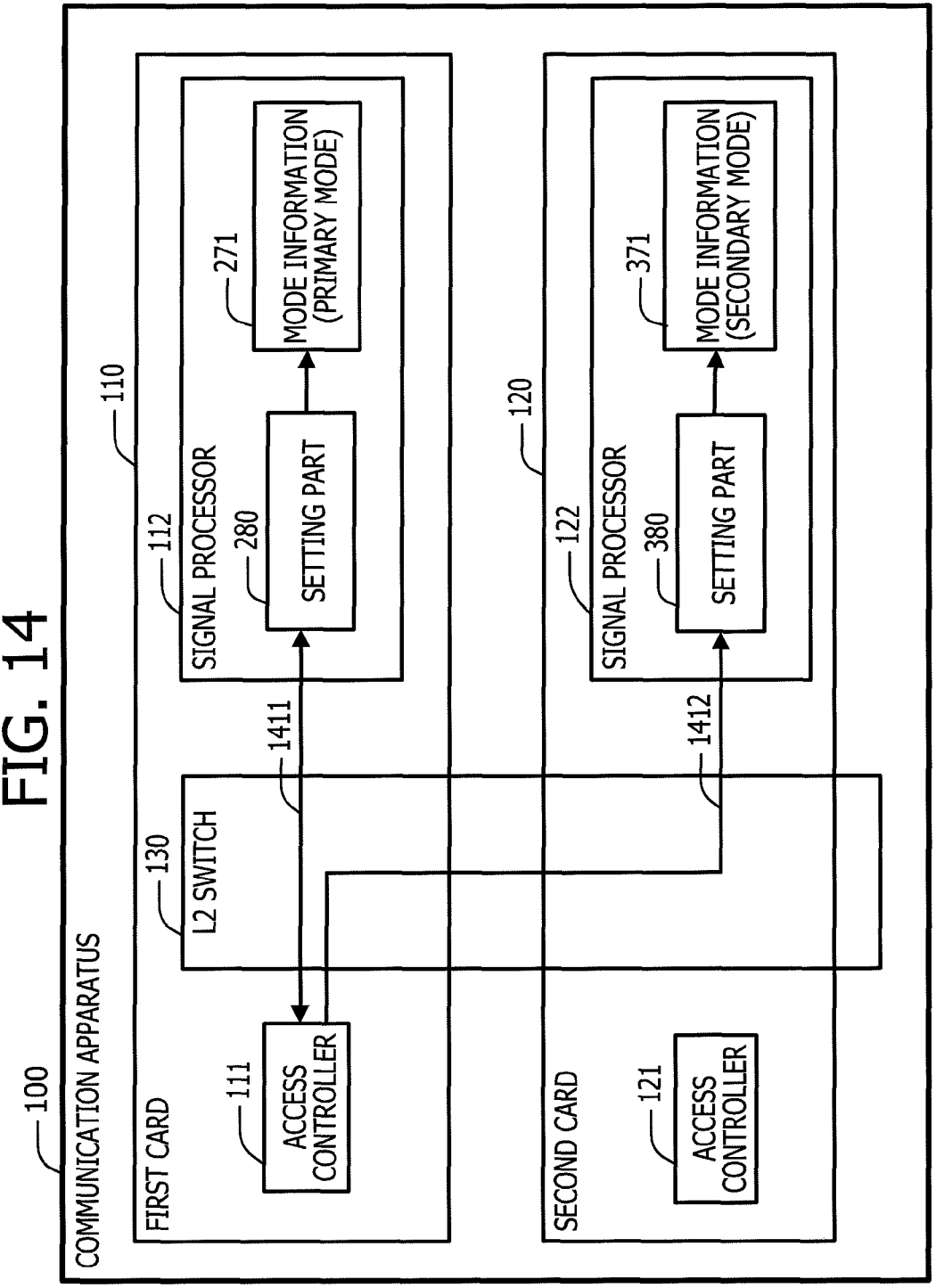
FIG. 14 is a schematic diagram illustrating an example of a procedure for setting a value to mode information when a first card starts up, according to an embodiment.

FIG. 14 is a schematic diagram illustrating an example of a procedure for setting a value to mode information when a first card starts up, according to an embodiment. FIG. 14 represents parts of the communication apparatus 100 that are relevant to the procedure for setting a value to the mode information.

In FIG. 14, it is assumed that the first card 110 has the ID smaller than the second card 120 and is started up when the second card 120 is not being a primary card. In the case, for example, the access controller 111 of the first card 110 sets a value indicating a primary mode to the mode information 271 in the memory 270 by outputting a control signal 1411 to a setting part 280 of the first card 110 when executing the step S1305 of FIG. 13. Further, the access controller 111 of the first card 110 sets a value indicating a secondary mode to the mode information 371 in the memory 370 by outputting a control signal 1412 to the setting part 380 of the second card 120 when executing the step S1306 of FIG. 13. In this way, the access controller 111 of the first card may be configured to set values to both the mode information 271 and 371 by controlling both the setting part 280 of the first card 110 and the setting part 380 of the second card 120.

Figure 15:
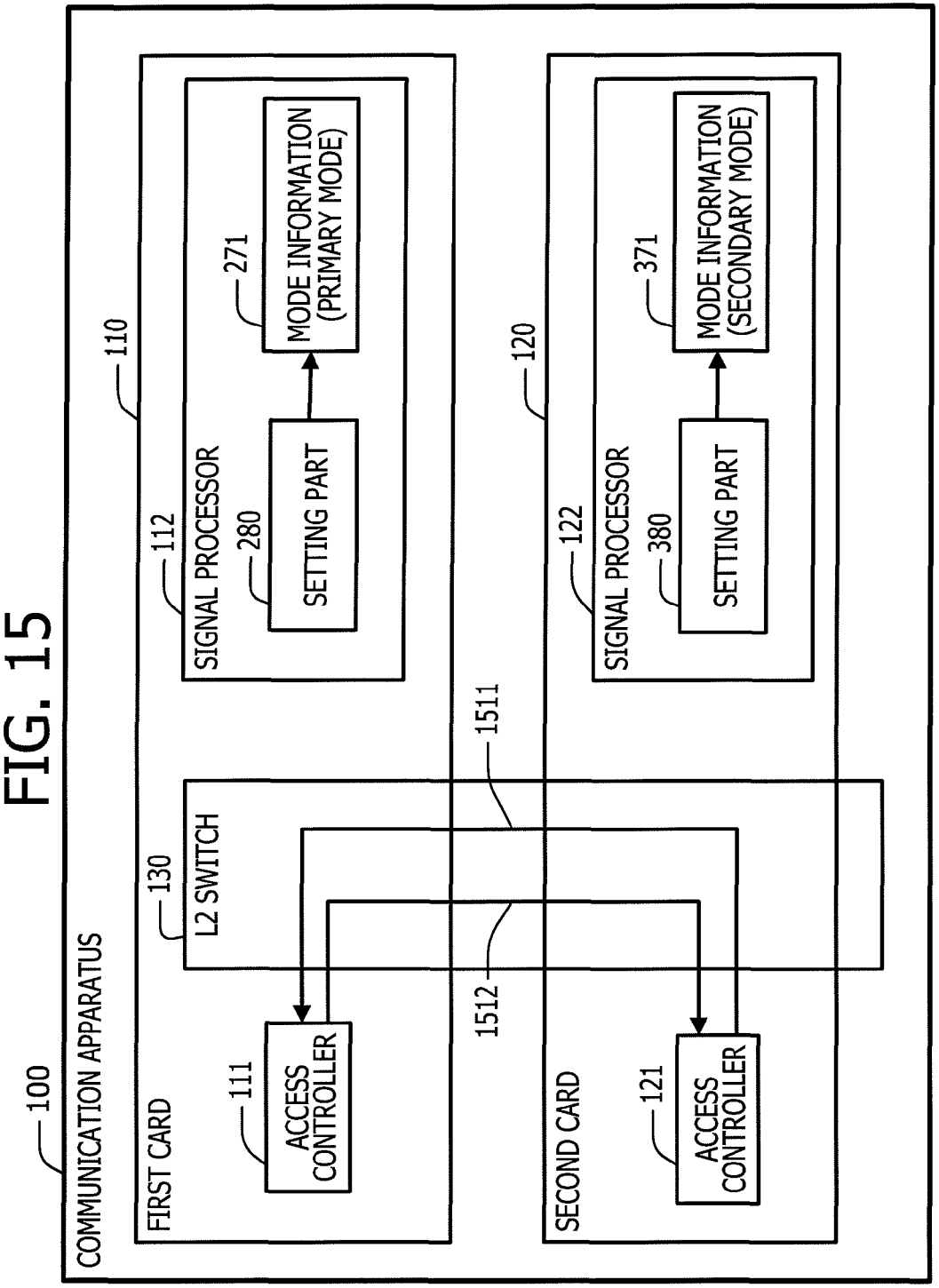
FIG. 15 is a schematic diagram illustrating an operation example for monitoring operating states of first and second cards by an access controller, according to an embodiment.

FIG. 15 is a schematic diagram illustrating an operation example for monitoring operating states of first and second cards by an access controller, according to an embodiment. After the startup processing depicted in FIG. 13 has been done, operating states (for example, whether a card is alive or not) of first and second cards within the communication apparatus 100 may be monitored by exchanging heart beat signals between the access controllers 111 and 121. In the example depicted in FIG. 15, heart beat signals 1511 and 1512 are exchanged between the access controllers 111 and 121 via the L2 switch 130.

Figure 16:
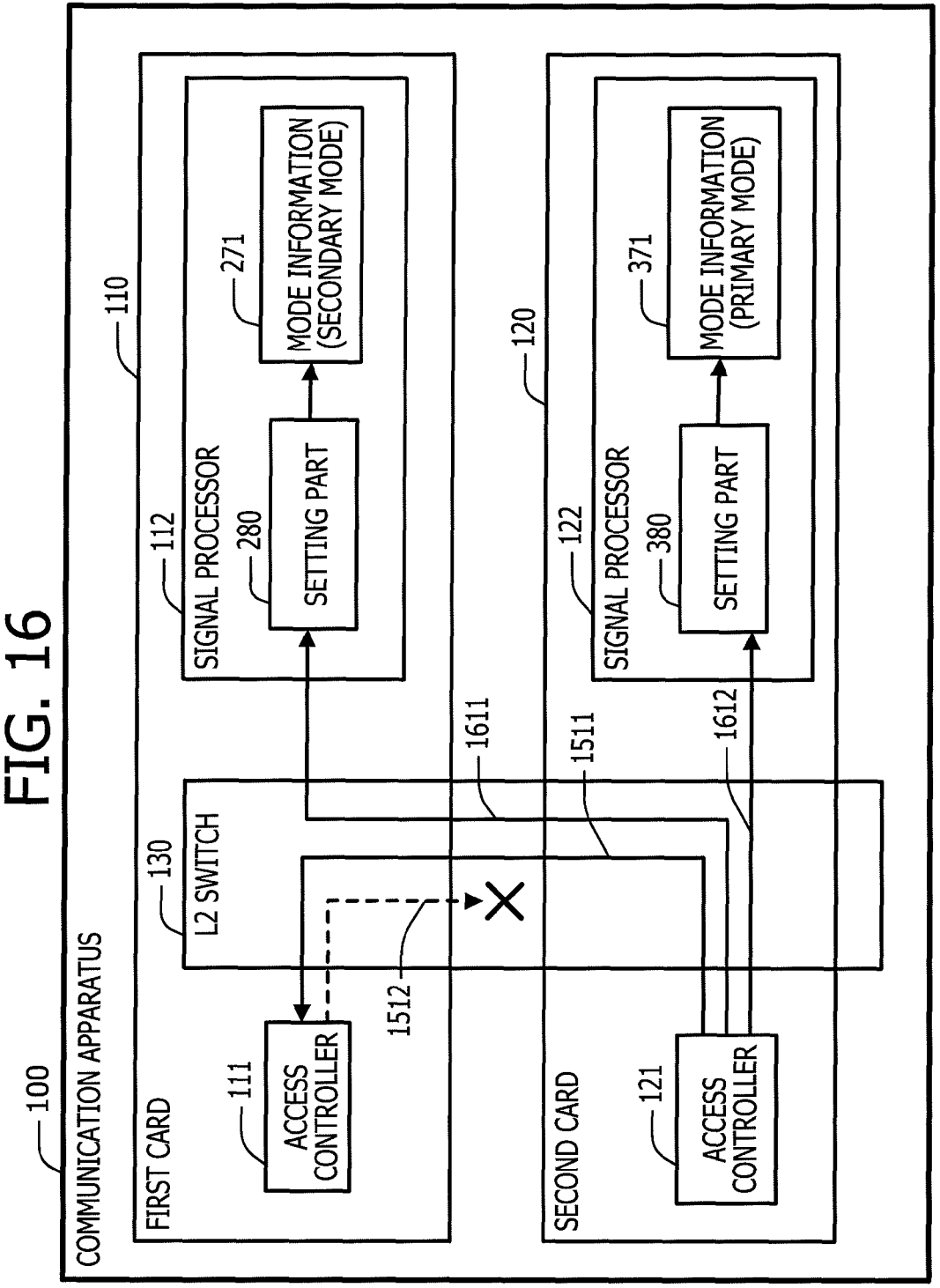
FIG. 16 is a schematic diagram illustrating an operation example for monitoring operating states of first and second cards by an access controller, according to an embodiment.

FIG. 16 is a schematic diagram illustrating an operation example for monitoring operating states of first and second cards by an access controller, according to an embodiment. In the example depicted in FIG. 16, it is assumed that a heart beat signal 1512, which is sent from the access controller 111 to the access controller 121, failed to reach the access controller 121 due to a failure occurrence in the access controller 111. In the case, the access controller 121 of the second card 120 may be configured to determine a failure occurrence in the access controller 111 of the first card 110 when the access controller 121 has not received the heart beat signal 1512 from the access controller 111 for a given time period.

Upon determining a failure occurrence, the accesses controller 121 of the second card 120 shifts its operating state from a standby state to an active state, and set a value indicating a secondary mode to the mode information 271 of the first card 110 by sending a control signal 1611 to the setting part 280 of the first card 110 via thy L2 switch 130. Further, the accesses controller 121 sets a value indicating a primary mode to the mode information 371 of the second card 120 by sending a control signal 1612 to the setting part 380 of the second card 120.

Next, the access controller 121 of the second card 120 (a primary card) sets primary and secondary transmission-routes by controlling the signal processor 122, and invokes the SCTP handler 123 of the second card 120. In the case, a second route 12 connected to the second card 120 is used as a part of a primary transmission-route, and a first route 11 connected to the first card 110 is used as a part of a secondary transmission-route. Thereafter, primary and secondary data-paths are established along the primary and secondary transmission-routes, respectively. In this case, operation for a multi-homing communication is similar to that described in FIG. 11, and the detailed description about the operation is omitted here.

In the example depicted in FIG. 16, when a failure has occurred in the first card 110 such that the access controller 121 of the second card 120 is not able to control the signal processor 112 of the first card 110, the first card 110 may be configured to autonomously shift its operating mode to an OOS mode, thereby setting a value indicting an OOS mode to the mode information 271. In this case, the secondary transmission-route and the secondary data-path established along the secondary transmission-route may be broken. Accordingly, a multi-homing communication with the MME 10 may not be performed.

Figure 17:
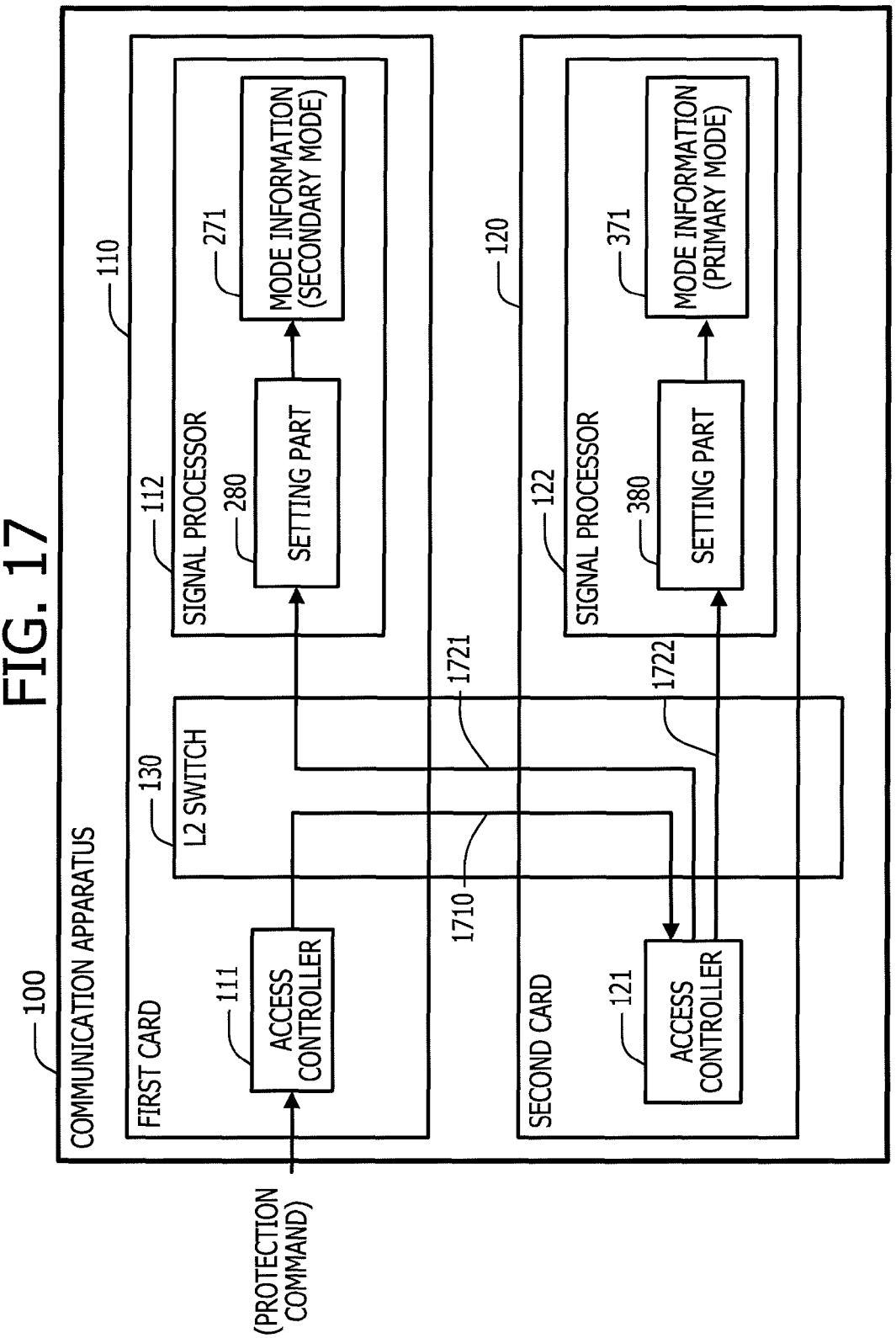
FIG. 17 is a schematic diagram illustrating an operation example for maintaining a first card, according to an embodiment.

FIG. 17 is a schematic diagram illustrating an operation example for maintaining a first card, according to an embodiment. In the case, it is assumed that, as an initial state, the first card 110 is operated as a primary card and the second card 120 is operated as a secondary card. Upon receiving a protection command, the access controller 111 of the first card 110 shifts its operating state from an active state to an OOS state, and sends a switch signal 1710 to the access controller 121 of the second card 120 via the L2 switch 130.

Upon receiving the switch signal 1710 from the access controller 111, the access controller 121 of the second card 120 shifts its operating state from a standby state to an active state. Then, the access controller 121 of the second card 120 sets a value indicating a secondary mode to the mode information 271 of the first card 110 by sending a control signal 1721 to the setting part 280 of the first card 110 via the L2 switch 130, and sets a value indicating a primary mode to the mode information 371 of the second card 120 card by sending a control signal 1722 to the setting part 380 of the second card, as depicted in FIG. 17.

Next, the access controller 121 of the second card 120 sets primary and secondary transmission-routes by controlling the signal processors 112 and 122, and activates the SCTP handler 123 of the second card 120, so as to perform a multi-homing communication. In the case, a second route 12 connected to the second card 120 is used as a part of the primary transmission-route, and a first route 11 connected to the first card 110 is used as a part of the secondary transmission-route, and primary and secondary paths are established along the primary and secondary transmission-routes, respectively. The operation for the multi-homing communication is similar to that described in FIG. 11, and the detailed description about the operation is skipped here.

Figure 18:
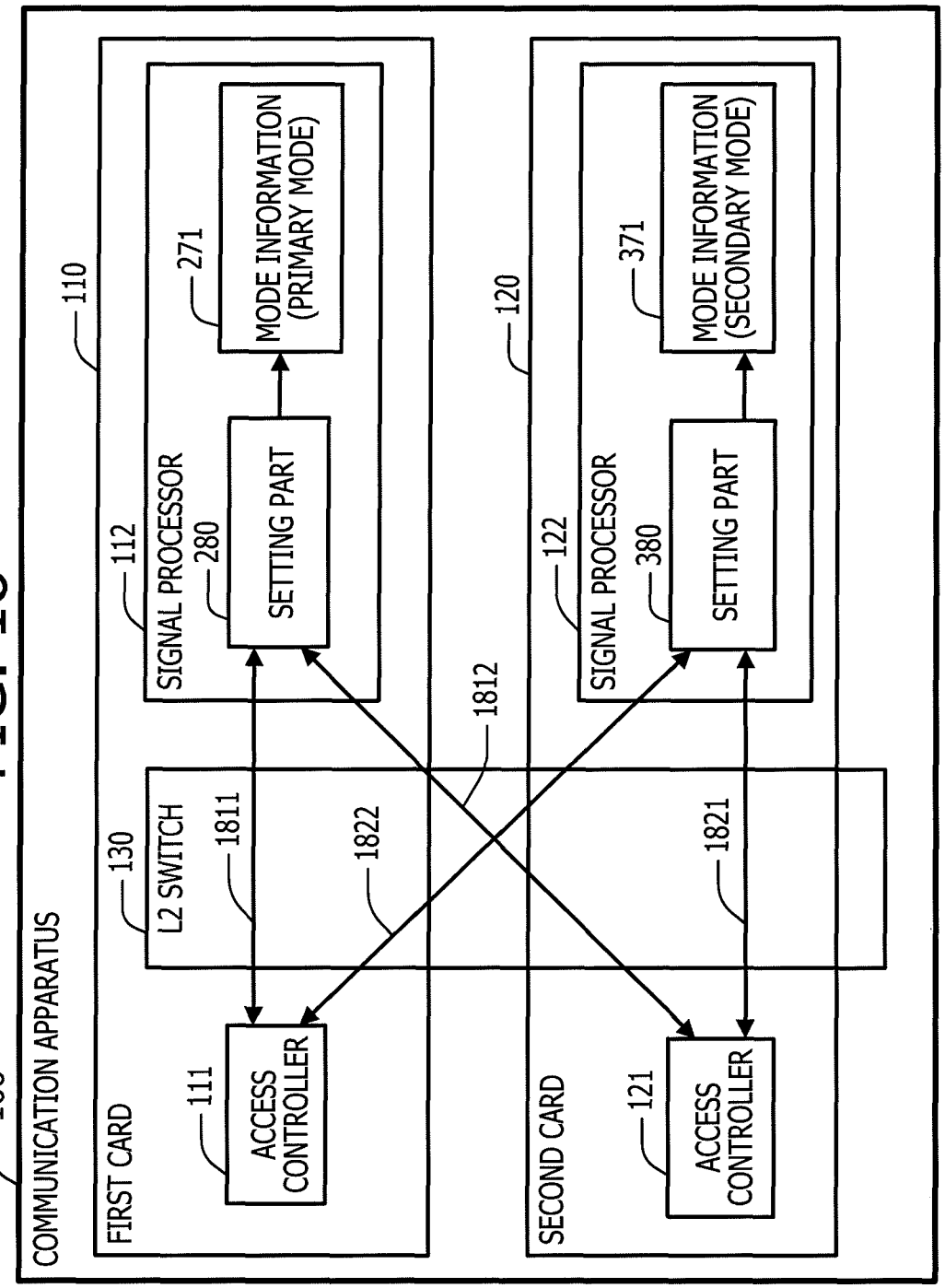
FIG. 18 is a schematic diagram illustrating an operation example for monitoring operating states of first and second cards by a setting part, according to an embodiment.

FIG. 18 is a schematic diagram illustrating an operation example for monitoring operating states of first and second cards by a setting part, according to an embodiment. In FIG. 18, it is assumed that the first card 110 is operated as a primary card, and the second card 120 is operated as a secondary card, as an initial state. The setting part 280 of the first card 110 monitors the operating state (for example, whether alive or not) of the access controller 111, by sending a health check signal 1811 to the access controller 111 and monitoring reception of a response to the health check signal 1811 from the access controller 111. Further, the setting part 280 monitors the operating state of the access controller 121 of the second card 120, by sending a health check signal 1812 to the access controller 121 and monitoring reception of a response to the health check signal 1812 from the access controller 121.

The setting part 380 of the second card 120 monitors the operating state (whether alive or not) of the access controller 121 of the second card 120, by sending a health check signal 1821 to the access controller 121 and monitoring reception of a response to the health check signal 1821 from the access controller 121. Further, the setting part 380 monitors an operating state (whether alive or not) for the access controller 111 of the first card 110, by sending a health check signal 1822 to the access controller 111 and monitoring reception of a response to the health check signal 1822 from the access controller 111. Here, health check signals and responses thereto are transmitted via the L2 switch 130 between the first and second cards.

Figure 19:
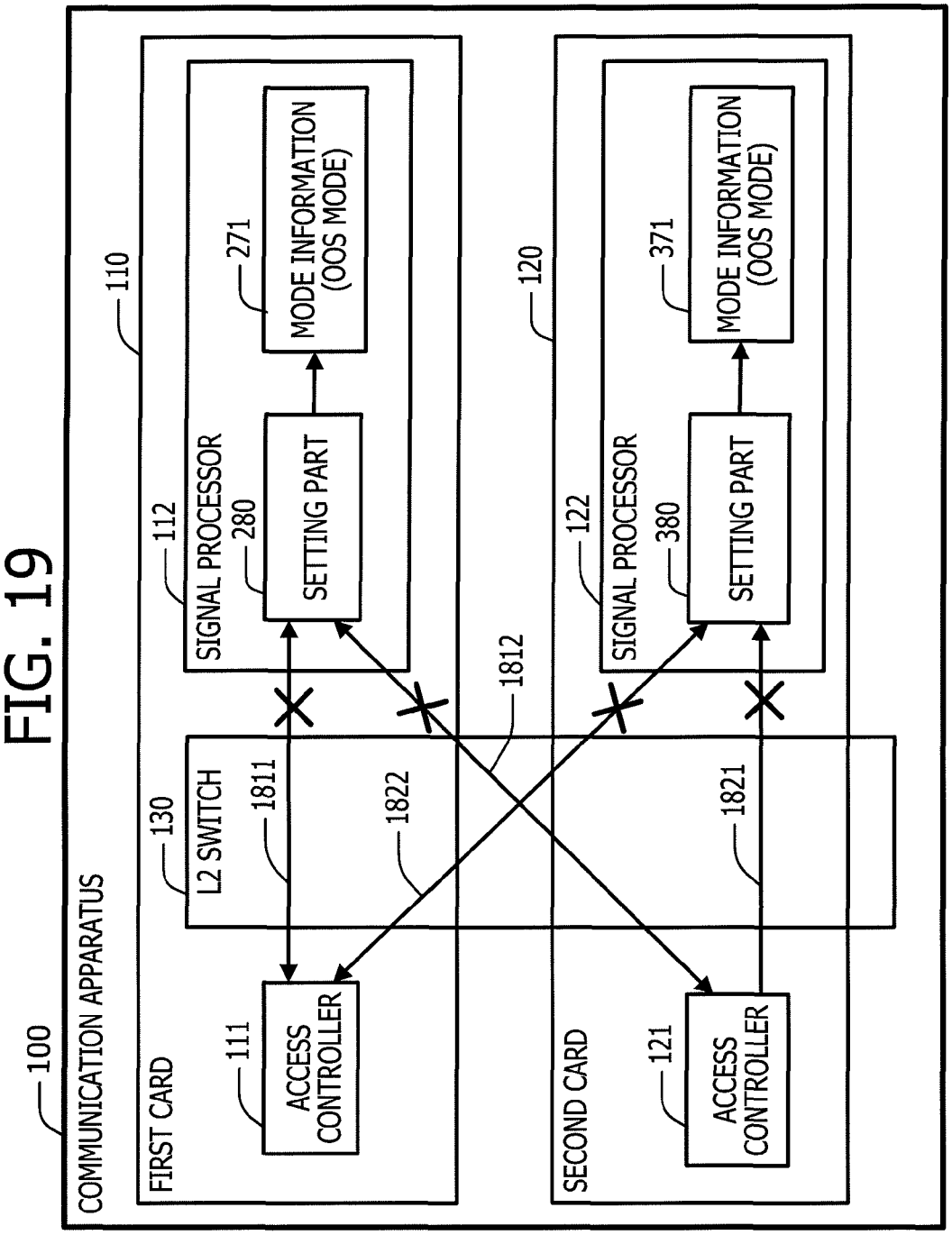
FIG. 19 is a schematic diagram illustrating an operation example for monitoring operating states of first and second cards by a setting part, according to an embodiment.

FIG. 19 is a schematic diagram illustrating an operation example for monitoring operating states of first and second cards by a setting part, according to an embodiment. In the example depicted in FIG. 19, it is assumed that a failure has occurred in both of the access controllers 111 and 121. In the case, the setting part 280 determines that a failure has occurred in both the access controllers 111 and 121 when a response to a health check signal has not been received from each of the access controllers 111 and 121 for a given time period.

Upon determining that failures have occurred in both the access controllers 111 and 121, the setting part 280 sets a value indicating an OOS mode to the mode information 271, as depicted in FIG. 19.

In a way similar to the case of the setting part 280, the setting part 380 determines that a failure has occurred in both the access controllers 111 and 121 when a response to a health check signal is not received from each of the access controllers 111 and 121 for a given time period. Then the setting part 380 sets a value indicating an OOS mode to the mode information 371, as depicted in FIG. 19.

When a failure has occurred in both the access controller 111 and 121, depending on conditions, a value indicating a secondary mode may be set to both the mode information 271 and 371 since none of the access controller 111 and 121 are operated normally. In the case, data received from the MME 10 by the first card 110 may be transferred to the second card 120 and may be returned back to the MME 10 by the second card 120. Similarly, data received from the MME 10 by the second card 120 may be transferred to the first card 110 and may be returned back to the MME 10 by the first card 120.

In order to prevent data received from the MME 10, from returning back to the MME 10, the route switch 220 of the signal processor 112 may be configured to discard data received from the primary transmitter 211 when a value indicating an OOS mode is being set to the mode information 271. In the same way, the route switch 320 of the signal processor 122 may be configured to discard data that was received from the network receiver 332 when a value indicating an OOS mode is being set to the mode information 371.

When a failure has occurred in one of the access controller 111 or 121, the failure may be detected by the other one of the access controllers 111 or 121 which is being operated in a active state. Therefore, data received from the MME 10 may be processed properly.

Figure 20:
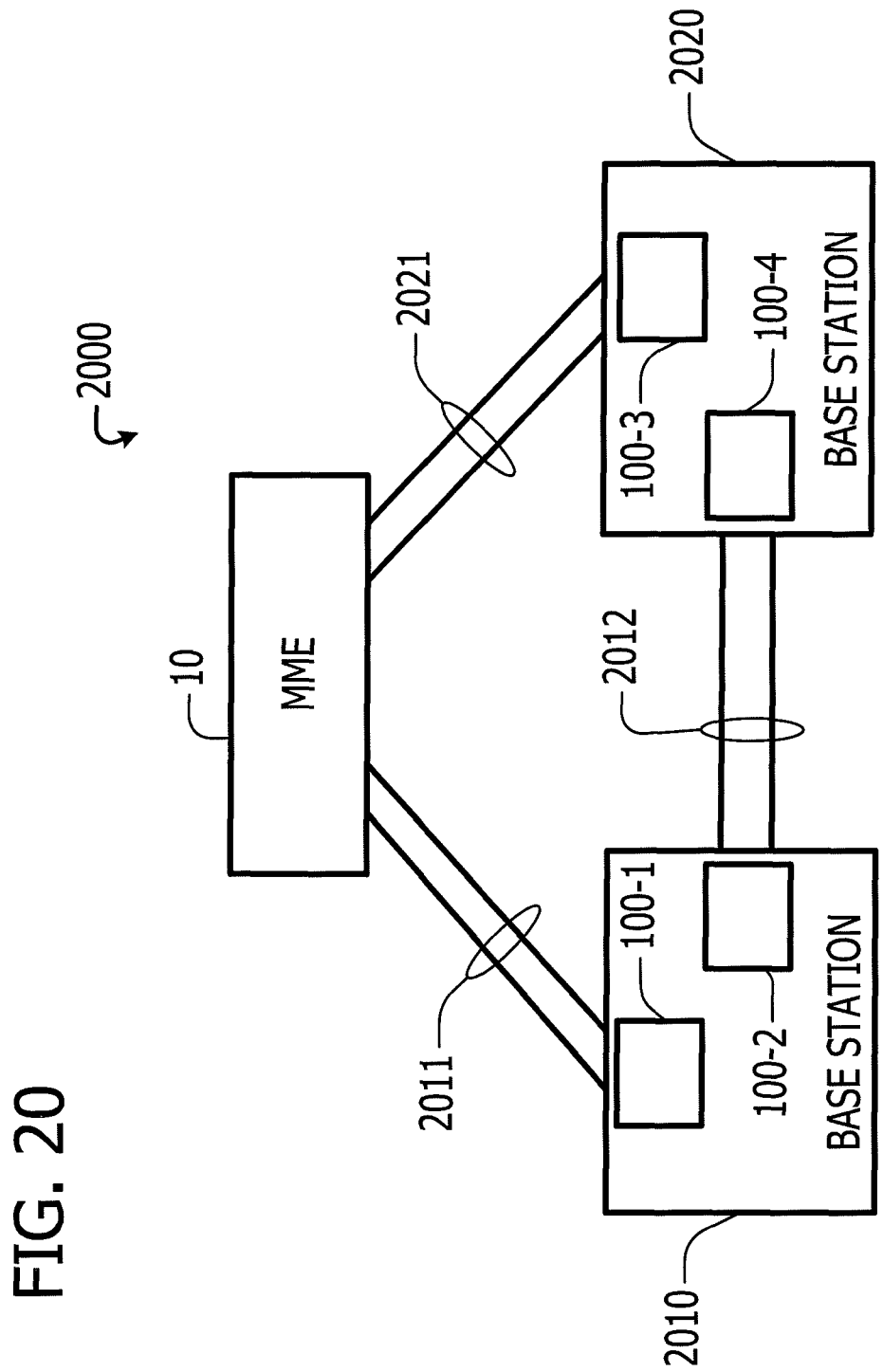
FIG. 20 is a diagram illustrating a configuration example of a communication system, according to an embodiment.

FIG. 20 is a diagram illustrating a configuration example of a communication system, according to an embodiment. In FIG. 20, an example of a 3G communication system is depicted as a communication system 2000 according to an embodiment. The communication system 2000, for example, may be configured to include a MME 10, base stations 2010 and 2020. The base station 2010 may be configured to include a communication apparatus 100-1 for performing a multi-homing communication with the MME 10 through a pair of data-paths (denoted by "2011" in FIG. 20). Further, the base station 2010 may be configured to include a communication apparatus 100-2 for performing a multi-homing communication with the base station 2020 through a pair of data-paths (denoted by "2012" in FIG. 20).

The base station 2020 may be configured to include a communication apparatus 100-3 for performing a multi-homing communication with the MME 10 through a pair of data-paths (denoted by "2021" in FIG. 20). Further, the base station 2020 may be configured to include a communication apparatus 100-4 for performing a multi-homing communication with the base station 2010 through a pair of data-paths (denoted by "2012" in FIG. 20).

As mentioned above, multi-homing communications may be performed among communication devices, such as the MME 10, the base station 2010, and the base station 2020, by applying a communication apparatus 100 of the present invention, to each of the base stations 2010 and 2020. The communication apparatus 100 of the present invention may be configured to communicate with not only a MME 10 but also other communication devices such as base stations 2010 and 2020. It is also possible to perform a multi-homing communication between base stations 2010 and 2020 by equipping each of the base stations 2010 and 2020 with a communication apparatus 100 of the present invention.

In a communication apparatus 100 according to an embodiment of the present invention, a communication tunnel may be formed between a primary card and a secondary card. The communication apparatus 100 transmits primary data to be transmitted through a primary data-path, from the primary card through one of first and second routes connected to the primary card. Further, the communication apparatus 100 transmits secondary data to be transmitted through a secondary data-path, from the primary card by transferring the secondary data from the primary card to the secondary card via the communication tunnel so that the secondary data is transmitted from the secondary card through the other one of the first and second routes connected to the secondary card. Thus, a multi-homing communication may be performed with improved reliability by using a redundant configuration of the primary and secondary cards. Further, in the secondary card, a protocol handler such as a SCTP handler is not activated, reducing electrical power consumptions.

Primary and secondary cards form a communication tunnel between the primary and secondary cards by transferring data to each other using a local address assigned to each of the primary and secondary cards. Therefore, source and destination addresses of the transferred data are fixed, allowing the communication apparatus to transfer data between the primary and secondary cards without implementing a complicated routing control part such as a NAT or a NATP. This also allows a stable and high-speed data transfer, and the size of a communication apparatus may be reduced.

As described above, a communication apparatus according to the present invention allows a multi-homing communication with improved reliability by using a redundant configuration of primary and secondary cards. In the example of FIG. 1, a configuration in which a communication apparatus 100 communicates with a MME 10 is described. However, communication devices with which the communication apparatus 100 communicates may be a base station (as depicted in FIG. 20) or communication devices other than a base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus for transmitting data through a plurality of data-paths, comprising:
   a first card connected to another communication apparatus through a first route connected to the first card;
   a second card connected to the another communication apparatus through a second route connected to the second card; and
   a card-to-card link connecting the first and second cards within the communication apparatus, wherein
   each of the first and second cards includes a protocol handler and an access controller, the respective protocol handler being configured to establish, based on a given protocol, a plurality of data-paths, and to perform transmission of data through the established plurality of data-paths, the respective access controller being configured to control the first and second cards so that an access controller included in one of the first and second cards is in an active state and an access controller included in the other one of the first and second cards is in a standby state;
   one of the first and second cards is determined to be a primary card when the access controller thereof is in the active state, the primary card controlling transmission of data between the communication apparatus and the another communication apparatus, and the other one of the first and second cards is determined to be a secondary card when the access controller thereof is in the standby state, the secondary card being operated under control of the primary card;
   the primary card is operable to set a primary transmission-route for establishing a primary data-path for transmitting primary data and a secondary transmission-route for establishing a secondary data-path for transmitting secondary data, the primary transmission-route connecting the primary card and the another communication apparatus via one of the first and second routes connected to the primary card, the secondary transmission-route connecting the primary card and the another communication apparatus via the card-to-card link and one of the first and second routes connected to the secondary card;
   the primary card is further operable to activate the protocol handler included therein to establish the primary and secondary data-paths along the primary and secondary transmission-routes, respectively, between the activated protocol handler and the another communication apparatus, based on the given protocol;

a local address for transferring data between the first and second cards within the communication apparatus is assigned to each of the first and second cards;

the secondary data is encapsulated with a header including the local addresses assigned to the first and second cards; and the primary and secondary cards are operable to transfer the encapsulated secondary data between the primary and secondary cards via the card-to-card link, based on the local addresses stored in the header of the encapsulated secondary data.

2. The communication apparatus of claim 1, wherein a global address for communicating with the another communication apparatus is assigned to each of the first and second cards; and the protocol handler of the primary card is configured to establish the primary and secondary data-paths using the respective global addresses assigned to the primary and secondary cards.

3. The communication apparatus of claim 2, wherein the primary card is configured to transmit the primary data to the another communication apparatus through one of the first and second routes connected to the primary card using, as a source address of the primary data, the global address assigned to the primary card, and the secondary card is configured to transmit the secondary data transferred from the primary card to the another communication apparatus through one of the first and second routes that is connected to the secondary card using, as a source address of the secondary data, the global address assigned to the secondary card.

4. The communication apparatus of claim 2, wherein the secondary card is configured to receive the secondary data from the another communication apparatus through the one of the first and second routes that is connected to the secondary card, using, as a destination address, a global address assigned to the secondary card, and to transfer the received secondary data to the primary card via the card-to-card link using, as a destination address of the secondary data, the local address assigned to the primary card; and the primary card is configured to receive the primary data from the another communication apparatus through the one of the first and second routes that is connected to the primary card, using, as destination address of the primary data, the global address assigned to the primary card.

5. The communication apparatus of claim 1, wherein, upon detecting a failure in the primary card, the secondary card is determined to be a new primary card that sets a new primary transmission-route;

the new primary card activates the protocol handler included therein; and the activated protocol handler of the new primary card establishes a new primary data-path along the new primary transmission-route so as to perform transmission of the primary data between the new primary card and the another communication apparatus through the established new primary data-path.

6. The communication apparatus of claim 5, wherein, upon detecting recovery from the failure, the new primary card determines one of the first and second cards that has recovered from the failure to be a new secondary card, and sets a new secondary transmission-route for establishing a new secondary data-path, the new secondary transmission-route connecting the new primary card and the another communication apparatus via the card-to-card link and the one of the first and second routes connected to the secondary card; and the protocol handler of the new primary card establishes the new secondary data-path along the new secondary transmission-route so as to perform transmission of the secondary data between the new primary card and the another communication apparatus through the new secondary data-path.

7. The communication apparatus of claim 1, wherein upon detecting a failure in the secondary card, the primary card disables the secondary transmission-route; and the primary card maintains the primary transmission-route so as to maintain transmission of the primary data between the primary card and the another communication apparatus through the primary data-path.

8. The communication apparatus of claim 1, wherein upon detecting failures in both the primary and secondary cards, the primary and secondary cards discard data received via one of the first and second routes so as to prevent the received data from returning back to the another communication apparatus via the other one of the first and second routes.

\* \* \* \* \*